US009665821B1

(12) United States Patent
Webb

(10) Patent No.: US 9,665,821 B1
(45) Date of Patent: May 30, 2017

(54) LONG-RANGE SURFACE-INSENSITIVE PASSIVE RFID TAG

(71) Applicant: ANTENNASYS, INC., Windham, NH (US)

(72) Inventor: Spencer Webb, Windham, NH (US)

(73) Assignee: ANTENNASYS, INC., Windham, NH (US)

( * ) Notice: Subject to any disclaimer, the term of this patent is extended or adjusted under 35 U.S.C. 154(b) by 0 days.

(21) Appl. No.: 15/384,288

(22) Filed: Dec. 19, 2016

(51) Int. Cl.
*G06K 7/08* (2006.01)
*G06K 19/06* (2006.01)
*G06K 19/077* (2006.01)
*H01Q 7/00* (2006.01)

(52) U.S. Cl.
CPC . *G06K 19/07773* (2013.01); *G06K 19/07758* (2013.01); *H01Q 7/005* (2013.01)

(58) Field of Classification Search
USPC .................................................. 235/451, 492
See application file for complete search history.

(56) References Cited

U.S. PATENT DOCUMENTS

| 7,503,491 | B2* | 3/2009 | Zhu | G06K 19/07749 235/451 |
| 2008/0055045 | A1* | 3/2008 | Swan | G06K 19/07749 340/10.1 |
| 2009/0309703 | A1* | 12/2009 | Forster | G06K 7/10178 340/10.1 |
| 2010/0045025 | A1* | 2/2010 | Cote | G06K 19/07749 283/81 |
| 2010/0230497 | A1* | 9/2010 | Brown | H01P 7/00 235/488 |
| 2011/0121080 | A1* | 5/2011 | Kai | G06K 19/07749 235/488 |
| 2011/0315774 | A1* | 12/2011 | Baba | G06K 19/0772 235/488 |
| 2013/0043315 | A1* | 2/2013 | Carr | H01Q 1/2225 235/492 |
| 2014/0339314 | A1* | 11/2014 | Sun | G06K 19/041 235/492 |
| 2014/0345534 | A1* | 11/2014 | Rhee | A01K 5/0114 119/61.5 |

* cited by examiner

*Primary Examiner* — Tuyen K Vo
(74) *Attorney, Agent, or Firm* — ARC IP Law, PC; Joseph J. Mayo

(57) ABSTRACT

A passive RFID tag that provides long-range reception, even when mounted on a conductive material or a human body. The antenna of the RFID tag is a loop antenna perpendicular to the mounting surface; it may be formed from a tubular sheet of conductive material to reduce conductive losses. An illustrative rectangular loop 1 inch wide by 0.15 inches high by 0.625 inches deep provides a high effective antenna aperture in a compact RFID tag. Multiple mounting positions may be provided for an RFID chip and for a resonating capacitor. Selection of different mounting positions for these components may allow tuning of impedance and resonant frequency without changing components, providing for simpler and more cost-effective manufacturing. The loop antenna may be formed for example from a stamped metal part with a hollow air core, from a double-sided thick PCB, or from an overlay of conductive ink onto a flexible material.

30 Claims, 24 Drawing Sheets
(13 of 24 Drawing Sheet(s) Filed in Color)

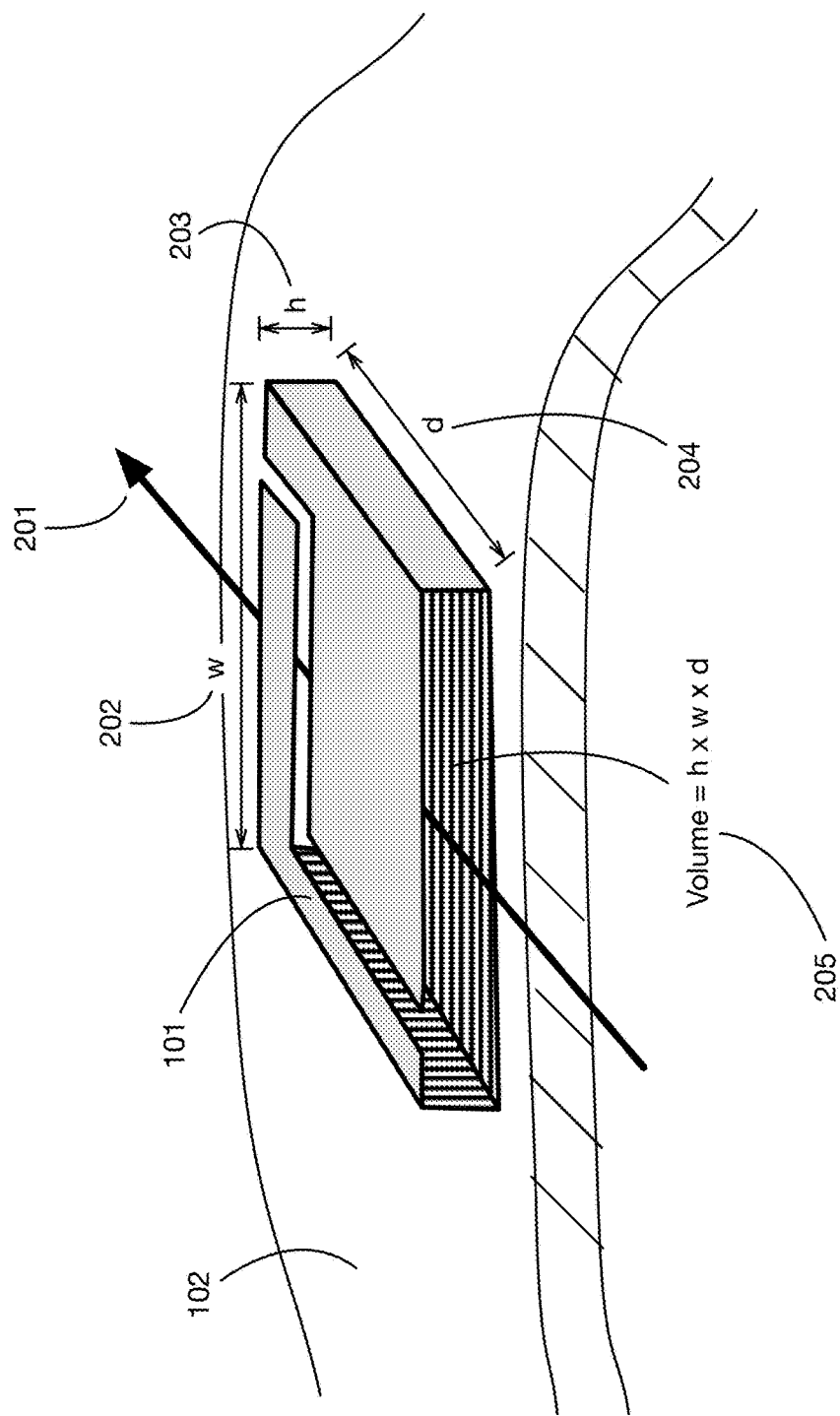

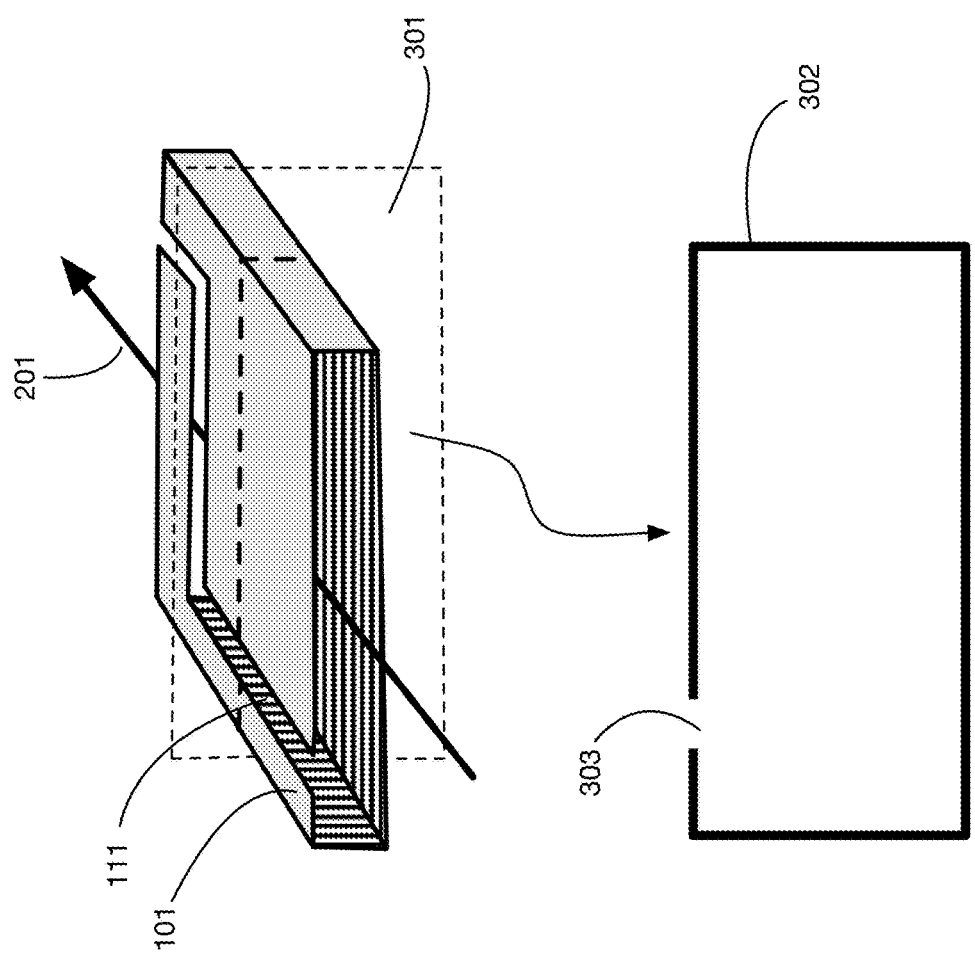

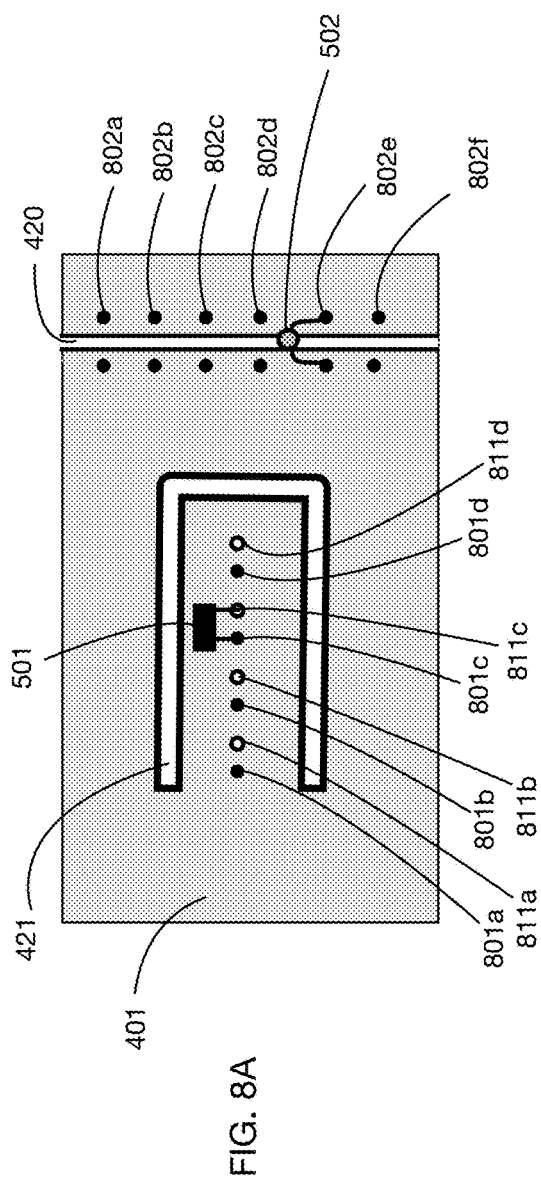
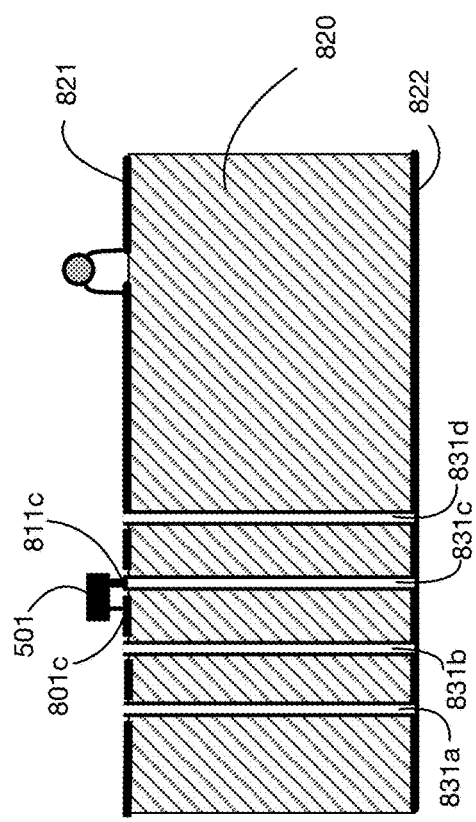
FIG. 8A
FIG. 8B

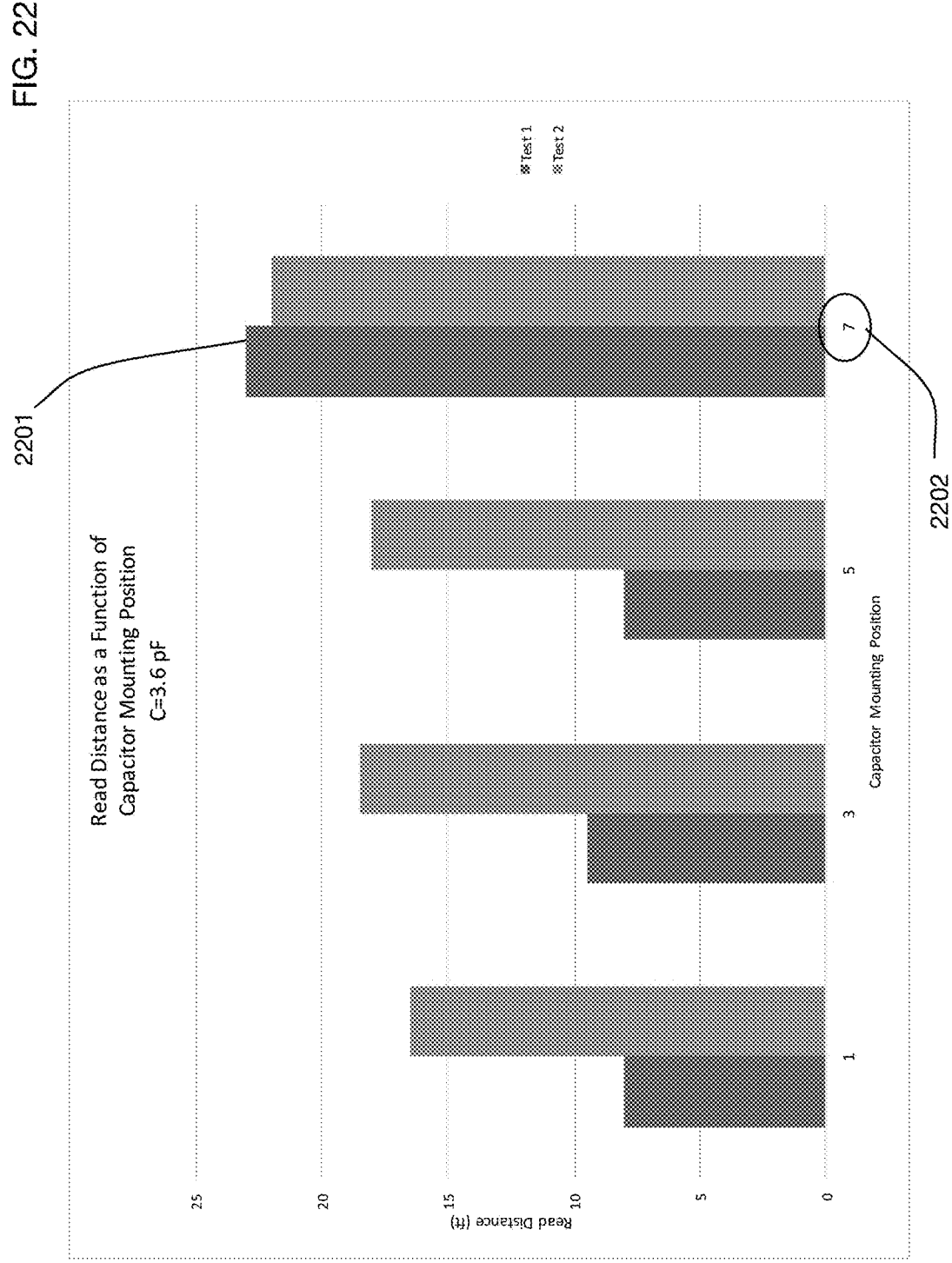

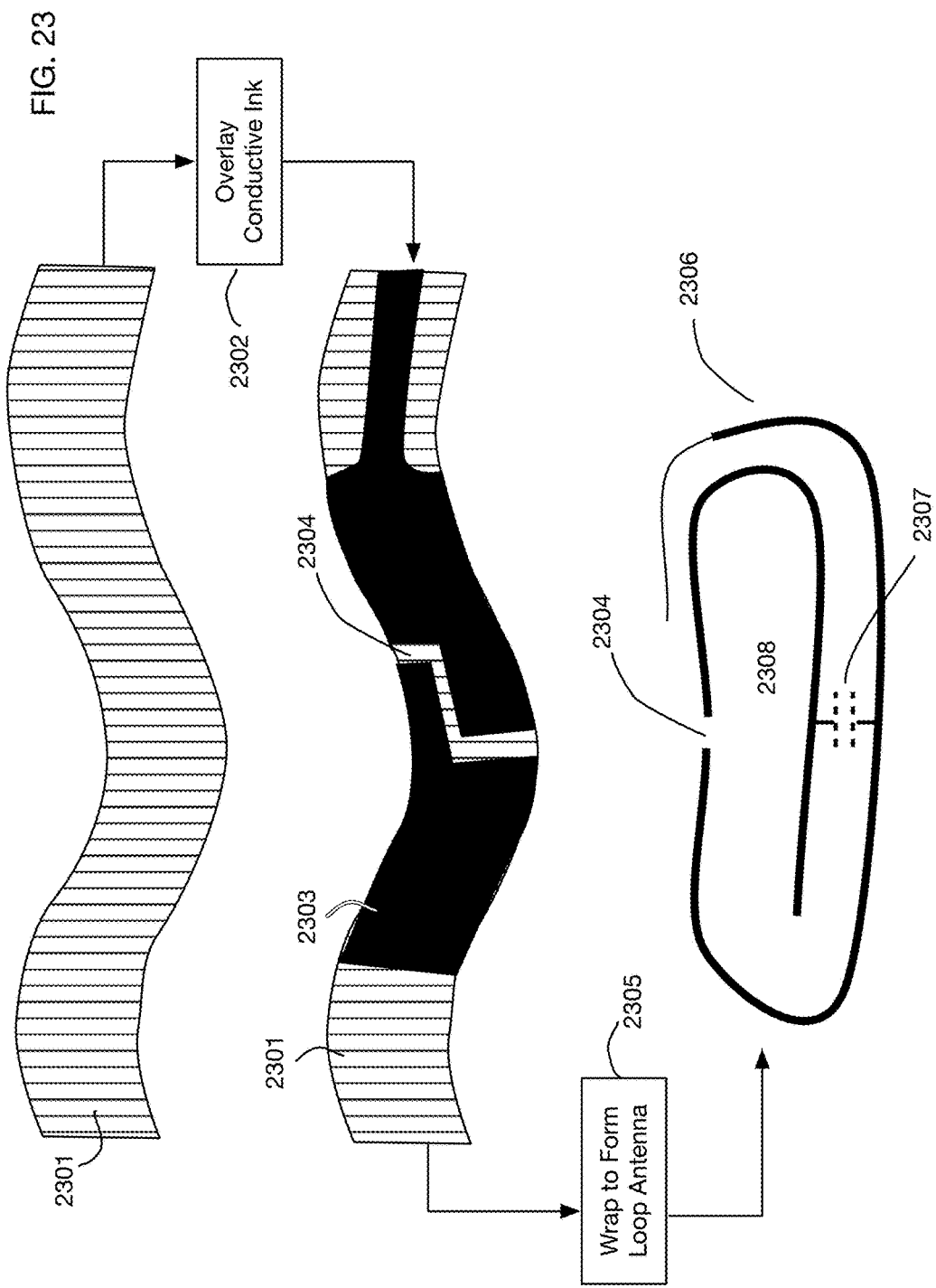

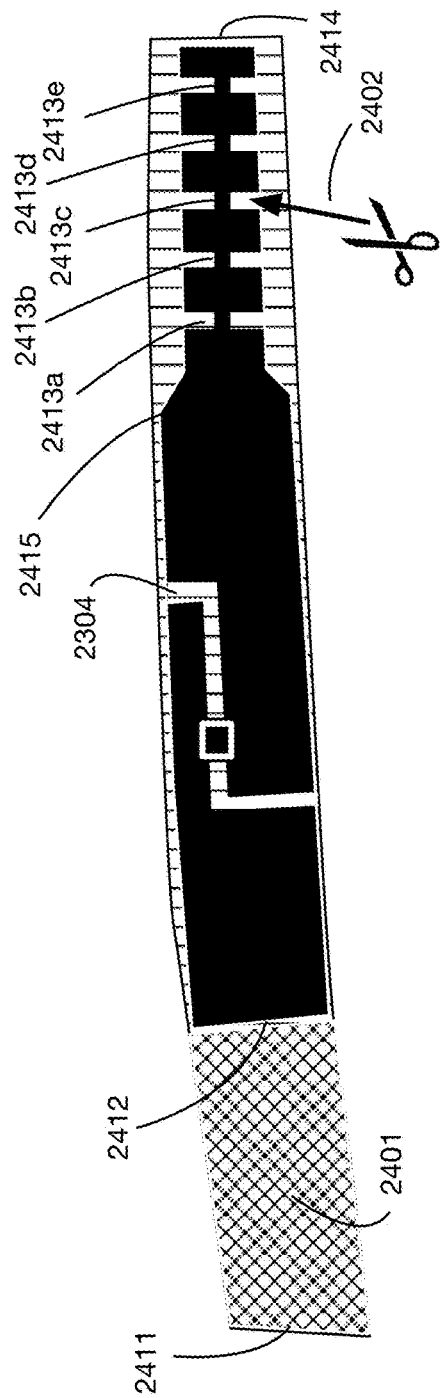
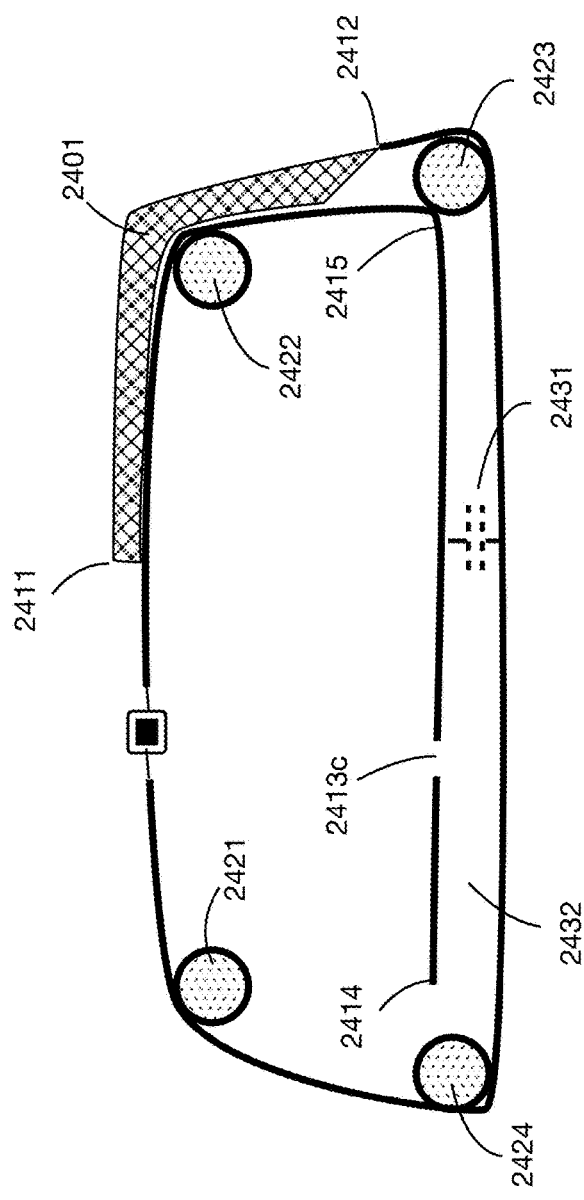
FIG. 24A
FIG. 24B

LONG-RANGE SURFACE-INSENSITIVE PASSIVE RFID TAG

BACKGROUND OF THE INVENTION

Field of the Invention

One or more embodiments of the invention are related to the field of radio-frequency identification (RFID). More particularly, but not by way of limitation, one or more embodiments of the invention enable a passive RFID tag that provides long-range reception and that is insensitive to the surface on which it is mounted.

Description of the Related Art

RFID systems use a specialized interrogator which transmits an RF (radio-frequency) signal and detects the signal reflected by a distant target, known as a "tag". The passive RFID tag has no battery and no transmitter. The tag has an antenna and a specialized RFID chip. The antenna intercepts a portion of the transmitted energy and delivers it to the chip. In this way, it is similar to the antenna on a conventional radio receiver. The principal difference is that the intercepted RF energy is rectified and used to power the RFID chip. Initially, and prior to powering up the circuitry in the chip, the input impedance to the chip is high. The antenna is resonant at the design frequency of operation, and therefore will act as a scatterer: it will absorb and reradiate a portion of the energy. The energy reflected by the tag may be received by the interrogator.

Initially, the interrogator may transmit an unmodulated carrier, providing power to the RFID chip. Subsequently, the interrogator may modulate the signal, transmitting a code to the RFID tag which may trigger some operation in the chip.

The purpose of the RFID chip is to modulate the signal from the interrogator by alternately lowering the impedance of the antenna terminals, i.e. shorting them, and returning them to the high-impedance state, i.e. opening them. This will cause the reflection to be strong in the high-impedance state, and weak in the low-impedance state. This enables the RFID chip to transmit information back to the interrogator without the need for a local power source or a conventional transmitter. This allows the RFID tag to be inexpensive and therefore disposable after its operational life has ended.

The RFID tag, therefore, has three main functions: (1) Intercept as much RF energy as possible for its physical size (have a large effective aperture), and re-radiate it, thus having a large radar cross-section (RCS) (i.e. a scatterer). (2) Deliver intercepted energy to an RFID chip by effective impedance matching. (3) Under control of the RFID chip, change the tuning of the antenna so as to selectively be a poor scatterer having a small radar cross-section (RCS), thus delivering encoded information in the reflected energy.

The RFID interrogator, or reader, is a conventional transmitter of a certain power level, and uses an antenna which may be directional. The product of the transmitter power and the antenna gain (inversely related to its beamwidth) determines at what distance the RF field strength is sufficient to power the RFID chip for a given tag configuration. The efficiency and gain of the RFID tag antenna affects the threshold strength of the RF field required to operate the RFID chip.

RFID tags are useful for detecting and tracking objects in various environments. The RFID chip may also be capable of storing and retrieving data specific to the object it is attached to. It is understandable how these low-cost tags are useful for tagging boxes and bins in a warehouse environment. Boxes and bins on a conveyor belt, for example, may be identified via their tag as they pass a specific physical point along the belt. Also, the tags may have information written to them as they enter or leave areas of the warehouse.

Many boxes or, for example, plastic bins have ample non-conductive space surrounding the side of the container to allow an RFID tag to be affixed without appreciably affecting its RF behavior. In the event of a cardboard box, for example, the tag can operate effectively during the useful life of the box, and be discarded with the box due to its low cost. At the end of the useful lifetime, the tag may be rendered inoperable by the interrogator so as not to interfere with the reading of other, useful tags.

Some applications require a tag to be affixed to a surface which is conductive. In this case, the design of the RFID tag antenna and its housing must take the conductive surface into account. Tags that are designed, for example, to be affixed to cardboard boxes may effectively cease to operate when affixed to a conductive surface.

Examples of conductive surfaces which may require a passive RFID tag include, for example, file cabinets, laboratory containers, computer components (servers, disk drives), and disposable foil containers for food or industrial ingredients.

Another important application for RFID tags is identifying and tracking people. People-tagging applications may include control of access to secured areas, tracking and timing of people crossing the finish line in a race, tracking prisoners in prison environments, tracking and identifying patients in a hospital situation, and tracking participants in an amusement or sports venue. There are several issues when tagging people including conductivity of the human body, RF blockage from the human body and methods of attaching the tag such that it is acceptable to the person while remaining effective. These issues may reduce the range over which the tag may be interrogated when compared the more benign environs of a cardboard box.

In order to be useful in people-tracking and -tagging, a passive RFID tag must therefore be very efficient and relatively insensitive to the surface it is mounted on. Further, it must be small enough such that a person will be able to support it on their body without significantly affecting the ability to perform chosen tasks. It must be capable of being interrogated over useful distances depending upon the application. Ideally, it must be of sufficiently low cost such that it may be discarded when its useful life has been exhausted, or may be given to a person to keep for long term use without great expense or the need for continued maintenance.

In all applications, it is generally desired for the tag to be physically as small as possible. Since the RFID chip itself is very small, the limiting factor for the total physical size is generally the antenna. As in all antenna applications, there are tradeoffs which put a lower limit on the achievable antenna size. In general, when relative antenna size is discussed, it refers to the ratio of the physical size with the size of a wavelength at the subject frequency, in free space. The physical size for the purpose of discussing efficiency is considered a sphere with the smallest radius that would enclose the antenna.

There exists a three-way tradeoff between antenna size, bandwidth and efficiency. Thus, the cost of size reduction is some combination of a reduced bandwidth and loss of efficiency. In small antennas, bandwidth is generally defined by the impedance matching, for example where the return loss is greater than 10 dB, or VSWR is less than 2:1.

Bandwidth reduction of a size-reduced antenna has performance implications in practice. If the resultant bandwidth is too narrow, it may not have acceptable performance over the desired band of operation. For example, in the USA RFID transponders may operate in the ISM band 902-928 MHz, a fractional bandwidth of about twenty-nine percent (29%). This is a fairly wide bandwidth for any size-reduced antenna. For example, the bandwidth of a thin dipole antenna is on the order of ten percent (10%). Therefore, bandwidth of the antenna is a relevant limiting factor in tag performance.

Efficiency is the ratio of achieved performance to theoretically ideal performance. It is manifested as signal loss in the antenna due to losses in the antenna structure, or losses coupled into the antenna circuit from adjacent materials. When the antenna is in the vicinity of a good conductor, it may detune the antenna, but losses are generally not coupled in. When the conductor has significant resistance, the associated RF losses will appear in the antenna circuit by coupling. The human body, for example, is a lossy conductor. Antennas in the vicinity of the human body will generally have reduced efficiency. The choice of antenna type will greatly affect this impact on efficiency.

As antennas are made physically small, they generally take one of two forms: small dipole or small loop. A small dipole is like a full-size dipole but it is generally shortened through the use of inductive loading. This can be in the form of a meander line or lumped inductors. When this happens, its input impedance goes up in magnitude. The near-field of such an antenna is dominated by the electric field. A small loop antenna has the opposite situation. As a loop antenna gets smaller, its near field is dominated by the magnetic field. A loop antenna generally uses a capacitance between the ends of the loop to resonate the loop. As a loop gets smaller, its input impedance gets smaller in magnitude.

In the vicinity of the human body, antennas with a dominant electric field such as small dipoles, are affected more than those that have a dominant magnetic field. This is because the human body has a very high relative dielectric constant (or permittivity) and a low relative permeability. Therefore a small loop antenna is a more desirable antenna when used near the human body than a small dipole antenna.

Most RFID tags, and much of the prior art, take the form of shortened dipoles, especially those that are designed into labels or "inlays" for application to cardboard boxes or similar containers. Other types of antennas intended for use in the UHF frequency band include ¼ wave antennas that require a dielectric in the middle, and that may not use a resonating capacitor. These types of antenna are by definition larger, being ¼ wavelength structures, than the apparatus detailed herein and are an order of magnitude more expensive. Known antennas of this type do not maximize the electric field on top, but rather on the edges and thus inherently have high loss. Therefore, tags based on either shortened dipole antennas or ¼ wave antennas are poor choices for applications on the human body or other conductive surfaces.

For at least the limitations described above there is a need for a long-range surface-insensitive passive RFID tag.

BRIEF SUMMARY OF THE INVENTION

One or more embodiments described in the specification are related to a long-range surface-insensitive passive RFID tag. Embodiments of the invention may use an electrically small, magnetic mode antenna oriented with the circulating RF current flowing in a plane perpendicular to the mounting surface. One or more embodiments may provide an inexpensive and effective mechanism to separately adjust both resonance and impedance matching by moving the position of a resonating capacitor and the position of an RFID chip along a slot in the antenna conductor. One or more embodiments may use an air-core structure for the lowest losses and lowest cost. One or more embodiments may enable metal-on-metal operation, for example for tracking equipment, and operation on a human body surface, for example in wristband, with minimal changes in performance. The same PCB design may be used for multiple loop sizes, enabling longer-range, larger tags where space permits. In one or more embodiments, a larger loop size, for example by increasing the height of the apparatus by a factor of two increases the read range by over 40%. One or more embodiments may utilize a portion of the structure itself as a parasitic capacitor for example in embodiments that for a tubular structure, and thus do not require a separate capacitor as the structure of the device itself serves two purposes, i.e., forms the loop and the capacitor using the same structure. For example, a flexible PCB structure may be used in one or more embodiments, with the ability to eliminate a discrete capacitor or to reduce component costs.

One or more embodiments may have a loop antenna that may be formed from or may incorporate a tubular sheet of conductive material. The term "tubular" is intended to include any shape where the sheet of conductive material folds, bends, twists, or curves to partially or completely encircle an air core; such a shape may include for example a frustum, a cone or portion of a cone, a box or portion of a box, a cylinder or portion of a cylinder, or any other type of structure that forms a loop of any shape. A central axis through the loop center may be oriented parallel to the mounting surface of an object, and the loop may be perpendicular to this mounting surface. The antenna may have a width parallel to the surface, a depth along the central axis, and height perpendicular to the surface. The tubular sheet of the antenna may have a slot extending along a surface of the sheet, such that a cross section of the antenna with a plane perpendicular to the central axis is an open loop. Illustrative embodiments may have, for example, a height of less than or equal to 0.25 inches, or in one or more embodiments a height of less than or equal to 0.15 inches. The cross-sectional area of the loop (width X height, for a loop with a rectangular cross section) may be greater than or equal to 0.1 square inches in one or more embodiments. In one or more embodiments, the cross-sectional area of the loop may be greater than or equal to 0.15 square inches. In one or more embodiments, the depth of the tubular sheet may be greater than or equal to 0.4 inches. In one or more embodiments, the depth of the tubular sheet may be greater than or equal to 0.6 inches.

The RFID tag may include a radio-frequency element, such as for example an RFID chip, that receives signals from the loop antenna. It may include a passive component, such as a resonating capacitor, that affects the resonant frequency of the loop antenna. Passive components may include for example inductors and resistors, or any other type of electric component instead of or in addition to capacitors, or any combination thereof. One or more embodiments may not have discrete passive components such as capacitors for loop resonance, but may instead use the parasitic capacitance of the antenna itself or of any part of the circuit connected to the antenna.

In one or more embodiments, there may be multiple mounting locations to couple the radio frequency element to the antenna. The impedance of the loop antenna as viewed by the radio frequency element may vary depending on which mounting location is selected for the radio frequency element. This allows the antenna feed-point impedance to be modified (and matched to the radio frequency element) without changing components. Similarly, in one or more embodiments there may be multiple mounting locations to couple the passive component (such as a resonating capacitor) to the antenna. The resonant frequency of the loop antenna may vary depending on which mounting location is selected for the passive component. This allows the resonant frequency of the antenna to be fine-tuned without changing components. Mounting locations for the radio frequency element, the passive component, or both, may lie along the slot in the tubular sheet of the antenna, for example to attach terminals of a component to each sides of the slot.

In one or more embodiments, the slot through the tubular sheet may be one or more connected line segments. These segments may not be collinear; in one or more embodiments there may be two, three, or more segments. In other embodiments the segments may be linear or nonlinear in shape, constant or non-constant distances between the sides of each segment. Adjacent segments of the slot may be perpendicular, for example, or in any other configuration or direction with respect to each other.

In one or more embodiments, the interior of the antenna loop may be an air core. In one or more embodiments, the radio frequency element and the passive component may be mounted on the interior surface of the tubular sheet, for example within the air core. One or more surfaces of the tubular sheet of the antenna may be a conductive layer on printed circuit board. One or more embodiments may include a printed circuit board with a top conductive layer and a bottom conductive layer that both form part of the tubular sheet of the antenna; the core of the antenna may be the printed circuit board substrate in these embodiments. In one or more embodiments with an antenna formed from top and bottom conductive layers on a printed circuit board, the radio frequency element mounting positions may connect the radio frequency element terminals to both the top conductive layer and the bottom conductive layer (for example through a via that passes through the substrate).

In one or more embodiments or more embodiments, all or part of RFID tag may incorporate a flex circuit, instead of or in addition to a rigid PCB. In one or more embodiments, the resonator (such as for example a resonating capacitor) may be integral to or otherwise formed by the structure of the flex circuit, rather than a discrete component. The flex circuit may for example have a layer of conductive ink overlaid onto a flexible material. The capacitance of the flex circuit may result partially or completely from an overlap of two regions of the flexible antenna conductive material. Tuning of the capacitance may be performed by changing the surface area of this overlap. For example, the conductive ink of the antenna may include one or more bridges that connect sections of the antenna; by severing a selected bridge, the effective conductive surface area of the overlapping regions that form the capacitor may be reduced, thereby affecting the capacitance. In other embodiments, the length of the end of the structure may be trimmed to reduce the surface area of the capacitor. In one or more embodiments, the length may be trimmed and one or more of the bridges may be severed to provide for fine and coarse tuning of the capacitance and thus resonating frequency of the apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 2 illustrates reference axes and dimensions for the antenna of FIG. 1.

FIG. 3 shows a cross section of the antenna of FIG. 1 in a plane normal to the mounting surface; the cross section is an open loop perpendicular to the surface.

FIGS. 8A and 8B illustrate top and side cross-sectional views of an embodiment with an antenna design as in FIG. 4C, showing multiple mounting locations for the RFID chip and the capacitor; RFID mounting locations include vias that attach one terminal of the chip to the bottom surface of a PCB in the antenna's core.

FIG. 22 shows results of read distance tests for the tag of FIG. 20 with a resonating capacitor of 3.6 pF.

FIG. 23 illustrates an embodiment of a loop antenna formed from a layer of conductive ink overlaid onto a flexible material such as Mylar®; the plastic is wrapped around to form the loop antenna, which also generates a parasitic capacitance in a region of overlap of the conductive ink.

FIGS. 24A and 24B illustrate top and side views, respectively, of an embodiment of the system based on flexible circuit, which includes an adjustment mechanism for the parasitic capacitance that changes the effective overlapping area by severing a bridge connecting part of the tubular sheet to the rest of the circuit.

DETAILED DESCRIPTION OF THE INVENTION

A long-range surface-insensitive passive RFID tag will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
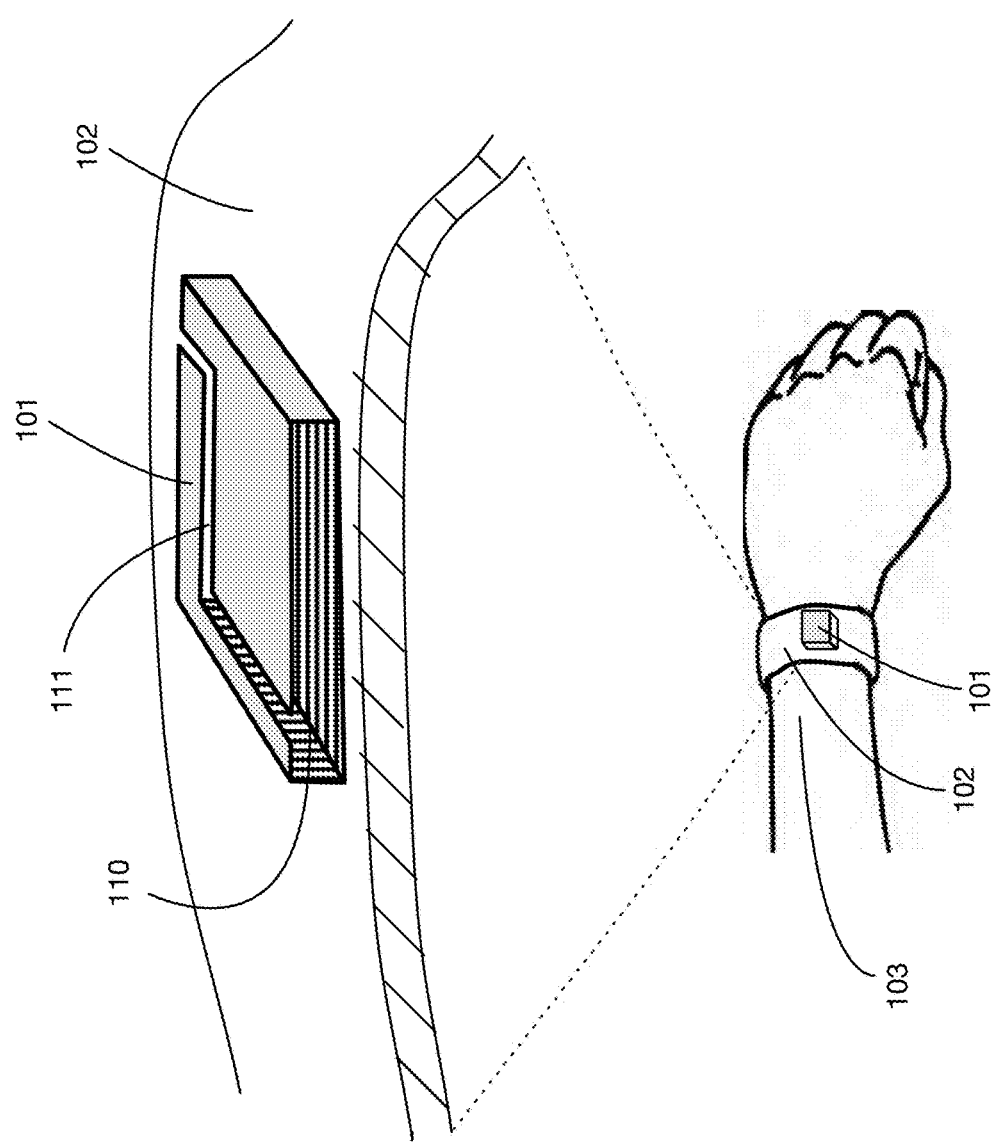
FIG. 1 illustrates an embodiment of an antenna for a long-range, surface-insensitive passive RFID tag, which is formed from a conductive sheet in a loop shape with the loop perpendicular to the mounting surface.

FIG. 1 illustrates an embodiment of an antenna that may be used with a long-range, surface-insensitive passive RFID tag. This figure shows only the antenna and a mount onto which the antenna is attached; other components of the RFID tag are described and illustrated below. Antenna 101 may be mounted for example on a surface such as human skin 103, or on an item such as a wrist band 102. In one or more embodiments, the antenna and the RFID tag may be mounted on any surface, including conductive surfaces or on or proximal to the body of a person. The tag may be attached directly to the surface, or it may include or be coupled to a mount such as wrist band 102 for example. Antenna 101 contains a sheet of conductive material in a tubular shape, which forms a loop antenna. In this example, the core 110 of the antenna loop is air. In one or more embodiments, the core may be made of or may include any material or materials, such as for example, without limitation, air or a PCB substrate material such as FR-4. The conductive sheet of antenna 101 has a slot 111 that is open. Topologically the antenna is therefore an open loop, with a slot between the ends of the loop. Typically there may be a high electric field between the ends of the loop, which in this illustration form a slot. The material in close proximity to that slot will contribute loss to the antenna proportional to the dielectric loss of that material. For example, low-cost fiberglass PC board material (e.g. FR-4) may have a dielectric loss tangent of about 0.02. High-cost PCB substrates may have a dielectric loss tangent of 0.002 or less. Air may have a loss tangent very close to zero. The smaller the antenna, the lower the radiation resistance, and the more that conductive losses and induced losses impact the total efficiency of the antenna. Therefore, one or more embodiments may use air as the core of the antenna for its low loss and low cost.

FIG. 2 shows reference axes and dimensions for the antenna 101 of FIG. 1. Conceptually a central axis 201 runs through the middle of the air core; this axis is substantially parallel to the mounting surface 102 on which the antenna is placed. Topologically the antenna is an open loop that is perpendicular to this axis 201. In one or more embodiments, the loop may be of any size and shape. The antenna of FIG. 2 has a cross-section that is rectangular, with width 202 along the mounting surface and height 203 above the mounting surface. The cross-section of the loop (w×h) determines the radiation resistance of antenna, or its coupling to free-space. The larger the cross-section, the larger the effective aperture of the antenna, and the greater flux that it can intercept. Therefore, in one or more embodiments the antenna may be configured with a relatively large cross-section to improve receptivity. For example, in one embodiment of the antenna, the width 202 (w) is 1 inch, and the height 203 (h) is approximately 0.15 inches, giving a cross-sectional area of approximately 0.15 square inches. In one or more embodiments, w, h and d may be varied to any other dimensions as desired based on the particular application and desired tradeoff between the size of the apparatus, bandwidth, efficiency and resulting read distance.

Instead of being formed from a wire, the loop of antenna 101 is formed from a conductive, tubular sheet with depth 204 along the central axis direction 201. Making the loop conductor wide may be advantageous because it lowers the conducted loss by lowering the current density. Therefore, in one or more embodiments the antenna may be configured with a relatively large depth to lower the conducted loss. For example, in one embodiment of the antenna the depth 204 (d) may be approximately 0.625 inches.

FIG. 3 shows a cross section 302 of antenna 101 along cutting plane 301 that is perpendicular to central axis 201 (and thus perpendicular to the mounting surface). This cross section is an open loop 302, with a gap 303 corresponding to slot 111. The loop 302 carries RF current in a plane primarily perpendicular (normal) to its mounting surface. By using a loop antenna in this orientation, the near field of the antenna is dominated by the magnetic field rather than by the electric field. This provides advantages for mounting on a conductive surface or on a surface (such as the human body) with a relatively high dielectric constant (or permittivity) and a low relative permeability. In particular, a loop antenna such as antenna 101 is preferably to a dipole antenna for mounting near the human body or another conductive surface.

Figure 4A:
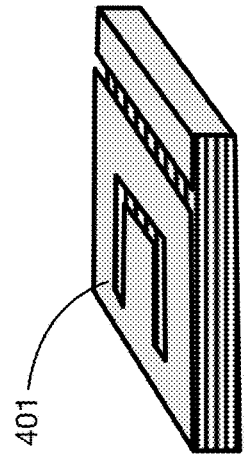
FIG. 4A illustrates a perspective view of the antenna of FIG. 1.
Figure 4B:
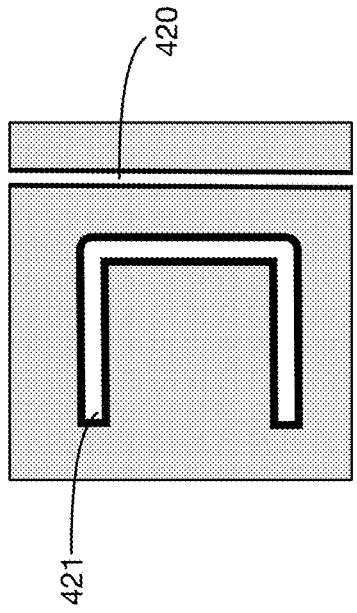
FIG. 4B illustrates a top view of the antenna of FIG. 4A, showing a slot in the top surface that contains three line segments.
Figure 4C:
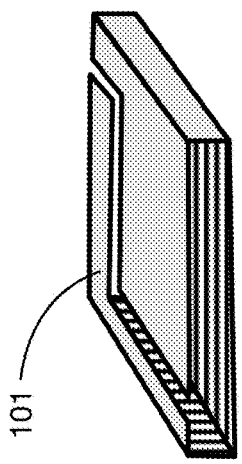
FIG. 4C shows a perspective view of another embodiment of an antenna for a long-range surface-insensitive passive RFID tag.
Figure 4D:
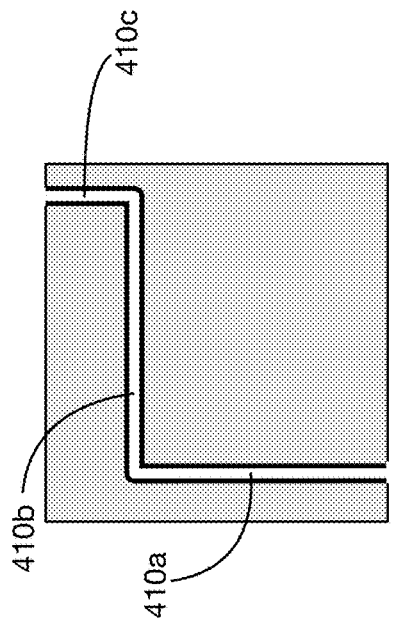
FIG. 4D illustrates a top view of the antenna of FIG. 4C, showing a linear slot across the top surface and an additional slot in the middle of the top surface.

The specific shape of the slot in antenna 101 is an illustrative example; one or more embodiments may use a loop antenna formed from a conductive sheet with a slot or slots of any desired shape or size. FIGS. 4A and 4B show perspective and top views, respectively, of antenna 101 of FIG. 1. The slot in this antenna is formed from three line segments 410a, 410b, and 410c. These segments are not collinear; segment 410b is roughly perpendicular to segments 410a and 401c. FIGS. 4C and 4D show perspective and top views, respectively, of a different embodiment of a loop antenna. Like antenna 101 this antenna 401 is formed from a tubular conductive sheet that forms an open loop oriented perpendicular to the mounting surface. However, the slot 420 across the top side of antenna 401 is a single line segment. In addition, the top of antenna 410 has an additional slot 421. In one or more embodiments, tuning the apparatus via slot 420 may be performed even if additional slot 421 is not utilized, and as such slot 421 is not otherwise required. One or more embodiments may use one or more slots of any size and shape to affect the electrical and magnetic characteristics of the antenna in any desired manner.

Figure 5:
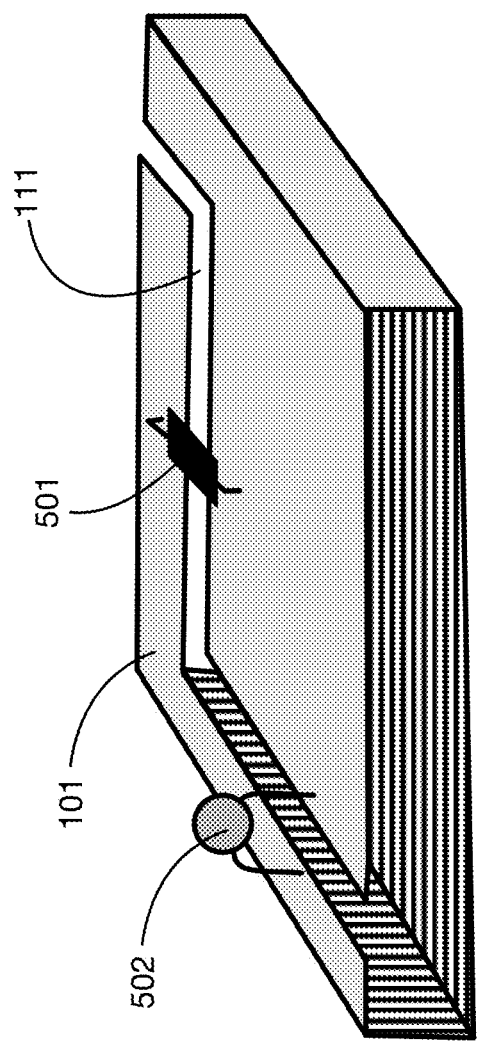
FIG. 5 shows the antenna of FIG. 1 with components added to form an RFID tag; components include an RFID chip and a resonating capacitor.

FIG. 5 illustrates the antenna 101 of FIG. 1 with additional components that may be included a passive RFID tag. These components may include for example, without limitation, a radio frequency element such as an RFID chip 501, and a passive circuit element such as a resonating capacitor 502. The antenna 101 may intercept a portion of the transmitted energy and deliver it to the radio frequency element 501. For a passive RFID tag, the intercepted RF energy may be rectified and used to power the radio frequency element. The radio frequency element 501 may modulate the signal from the interrogator by alternately lowering the impedance of the antenna terminals, i.e. shorting them, and returning them to the high-impedance state, i.e. opening them. This will cause the reflection to be strong in the high-impedance state, and weak in the low-impedance state. This enables the radio frequency element to transmit information back to the interrogator without the need for a local power source or a conventional transmitter. The radio frequency element 501 shown in FIG. 5 has two terminals, one terminal attached to the antenna on each side of the slot. An illustrative radio frequency element that may be used in one or more embodiments is a Higgs™ 3 single chip UHF RFID Tag integrated circuit made by Alien Technology LLC. One or more embodiments may use any type of radio frequency element or elements to receive signals and to modulate return transmissions, including for example, without limitation, any RFID chip, integrated circuit, processor, signal processor, DSP, digital circuit, or analog circuit, or any combination thereof.

In the embodiment shown in FIG. 5, the antenna loop is resonated with a capacitance that includes a discrete capacitor 502. Loop resonance may also be affected by parasitic capacitance. The discrete capacitor 502 may be disposed across the antenna slot 111, in parallel with the radio frequency element 501. The capacitance of capacitor 502 may be selected to tune the resonant frequency of the loop antenna; an illustrative capacitance value that may be used in one or more embodiments is approximately 2.2 pF. One or more embodiments may include other passive circuit components that may also affect the antenna resonance, including for example, without limitation, capacitors, inductors, or resistors. One or more embodiments may include active circuit elements instead of or in addition to passive circuit elements.

In one or more embodiments, it is desirable to have a mechanism for matching the impedance of the resonant loop antenna 101 to the radio frequency element 501. It is also desirable to have a mechanism for making changes to the effective capacitance value of capacitor 502 (or to parameters of other passive elements) in order to fine-tune the resonant frequency of the loop antenna 101.

In the field of microwave circuitry, such as oscillators and amplifiers, it is not unusual to slide a shunt bulk component along a transmission to optimize a tuning parameter such as power output. Once the optimal position is found, the component would be soldered in place. This is an effective, though labor-intensive method for trimming (fine-tuning). This method is generally not suitable for high volume production because it is labor-intensive. The inventor of the instant invention conceived, and experimentally observed, that the novel apparatus detailed herein may not require per-unit tuning, but rather may require tuning of large batches. Variables such as mechanical tolerances, the dielectric constant of PC boards, bulk component value variation, and compensation for the packaging and anticipated mounting surface are all contributors toward the desire for batch trimming.

If the slot 111 of the loop antenna 101 is configured as shown in FIG. 5, with multiple line segments in a zig-zag shape, a useful and surprising result occurs, allowing for the fine-tuning of both the resonant frequency of the antenna loop and the impedance matching to the radio frequency element. Discrete component mounting locations may be provided for both the resonating capacitor and the radio frequency element. By choosing one of several available mounting locations, the effective value of the capacitor and the effective impedance of the radio frequency element can be selected from several discrete values. The location of these components on a PC Board in large-scale production may be changed by a simple modification to the programming of the "pick-and-place" machine. The component locations may be already established, and the unused locations may be designated in the software as "no-load". Thus, by changing the component location, it may be unnecessary to change the capacitor value. This eliminates the need to stock many values of capacitors, and the need to use capacitors which are manufactured in very small value increments, which are usually expensive. In lab experiments, it was found that moving the capacitor position from one extreme location to the other extreme resulted in tuning which was approximately the same as the difference between standard values in low-cost capacitor series. This is nearly ideal for the purposes of fine-tuning the tag resonant frequency.

Figure 6:
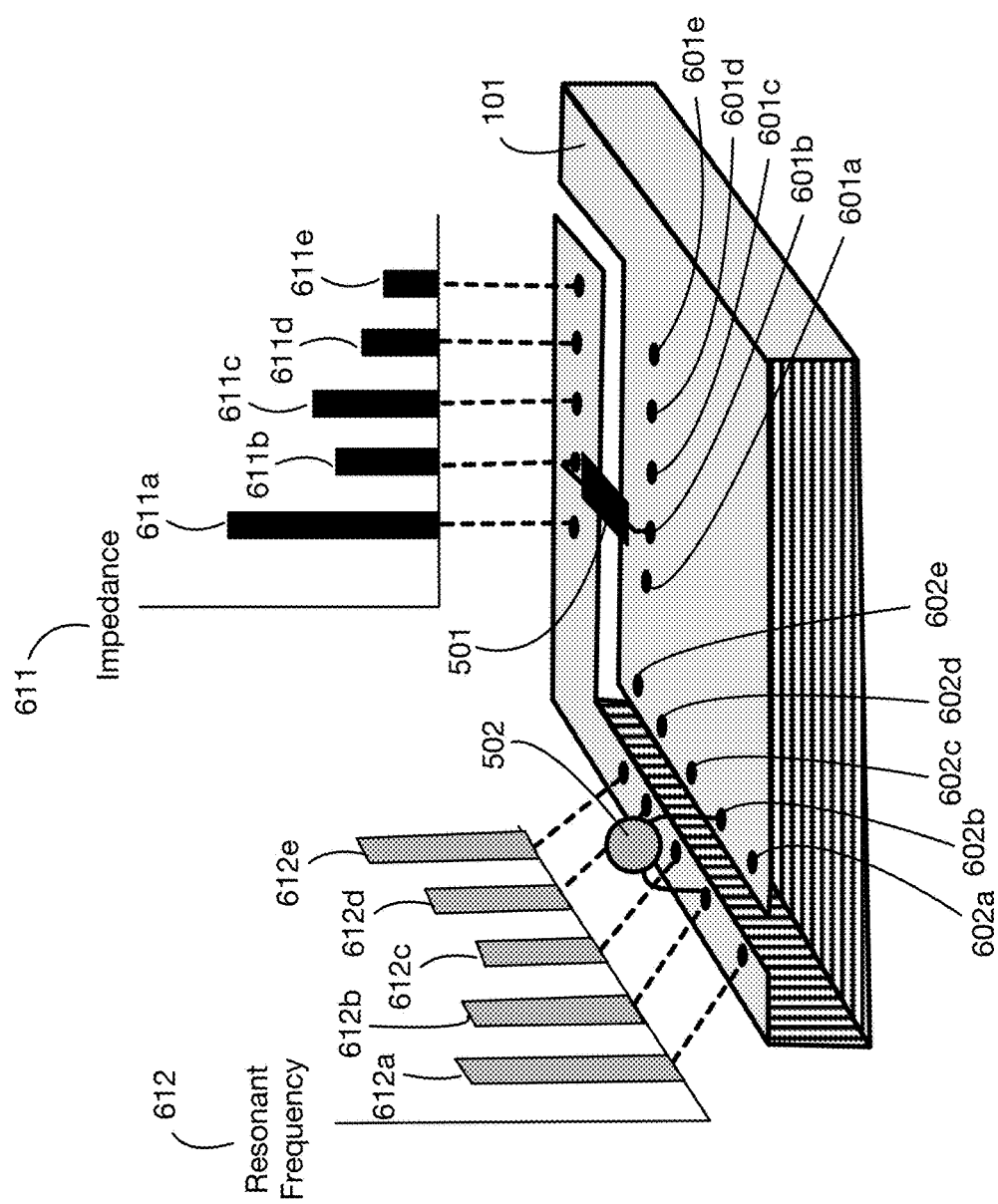
FIG. 6 illustrates an embodiment with multiple mounting locations for both an RFID chip and a resonating capacitor, and shows how the impedance varies with the selected RFID mounting location, and how the resonant frequency varies with the selected capacitor mounting location.

FIG. 6 illustrates an embodiment that uses multiple mounting locations as described above for tuning of impedance and resonant frequency. For illustration, five mounting locations are provided on antenna 101 for radio frequency element 501: 601a, 601b, 601c, 601d, and 601e. Each mounting location includes two attachment points, one on each side of the slot in the antenna. Graph 611 shows the impedance of the antenna to the radio frequency element 501 based on which mounting location is selected. (The values shown for impedance are illustrative and may not be representative of actual values for a particular embodiment.) For example, if element 501 is placed in mounting location 601a, the resulting impedance is 611a; similarly, impedance 611b corresponds to mounting location 601b, impedance 611c corresponds to mounting location 601c, impedance 611d corresponds to mounting location 601d, and impedance 611e corresponds to mounting location 601e. One or more embodiments may have any desired number of mounting locations for radio frequency element 501, in any desired location on the antenna 101 or on any element coupled to the antenna. In one or more embodiments, the mounting locations may be a function of one another or otherwise interact, such that if moving one component along one mounting location, then the other mounting location may also be altered to meet a desired impedance and/or resonant frequency as desired.

Similarly, in FIG. 6, for illustration there are five mounting locations provided on antenna 101 for resonant capacitor 502: 602a, 602b, 602c, 602d, and 602e. Each mounting location includes two attachment points, one on each side of the slot in the antenna. Graph 612 shows the resonant frequency of the antenna based on which capacitor mounting location is selected. (The values shown for resonant frequency are illustrative and may not be representative of actual values for a particular embodiment.) For example, if element 502 is placed in mounting location 602a, the resulting resonant frequency is 612a; similarly, resonant frequency 612b corresponds to mounting location 602b, resonant frequency 612c corresponds to mounting location 602c, resonant frequency 612d corresponds to mounting location 602d, and resonant frequency 612e corresponds to mounting location 602e. One or more embodiments may have any desired number of mounting locations for capacitor (or other passive element) 502, in any desired location on the antenna 101 or on any element coupled to the antenna.

In one or more embodiments, the loop antenna element may be inexpensively produced for example as a stamped metal part, and may be tin-plated for example to improve solderability. The capacitor and the radio frequency element may be placed on a printed circuit board via an automated system (pick-and-place). Then the antenna element may be placed over those components. Finally, the board may be reflow soldered.

Figure 7:
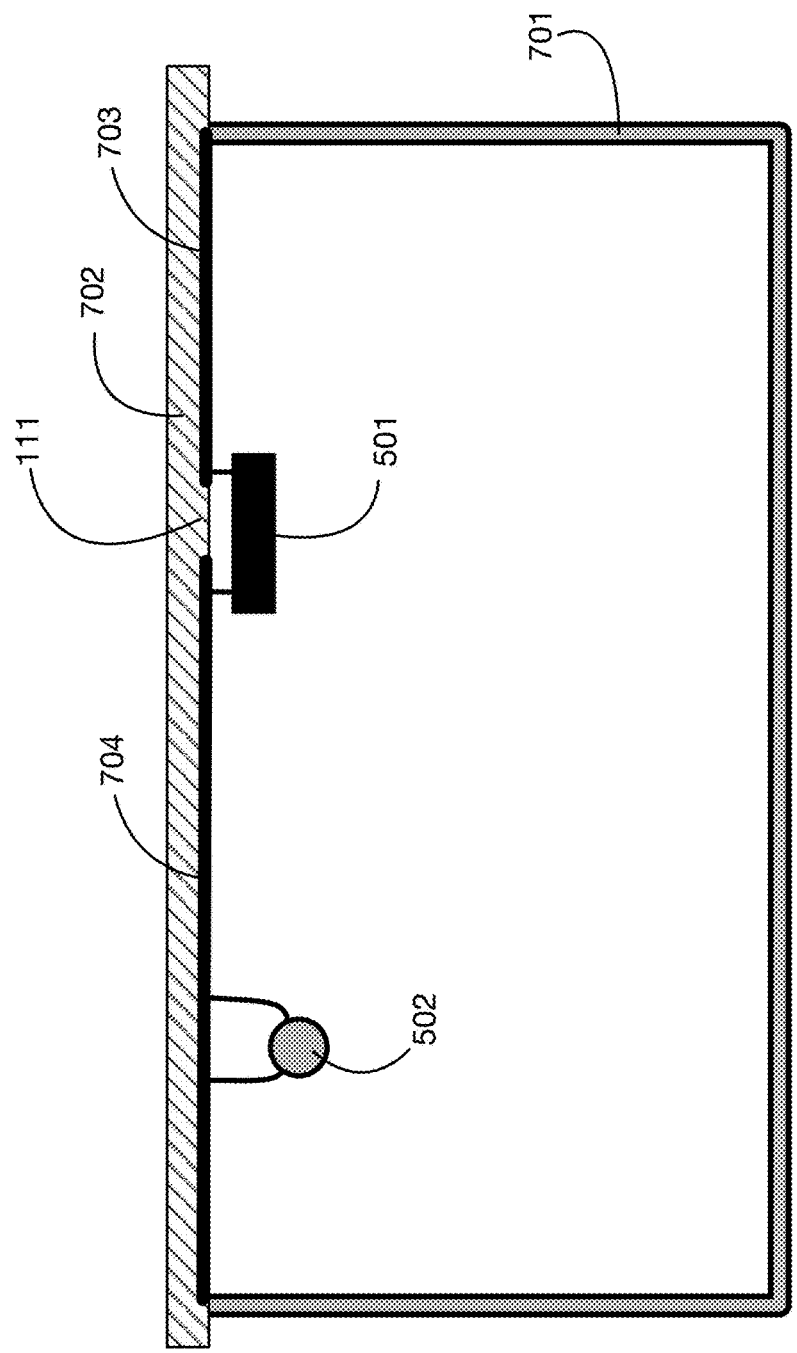
FIG. 7 illustrates a side cross sectional view of an embodiment of a tag with the antenna design of FIG. 1, with the top surface of the antenna formed from a PCB board, and components mounted on the inside of the antenna.

In one or more embodiments, the elements such as an RFID chip and a capacitor may be placed on the bottom side of a printed circuit board (the interior, facing the antenna core). The advantage of this construction is that the top and bottom of the RFID tag is flat, which aids packaging and protects the small components. This configuration is well-suited to being housed in a fabric material in, for example, a wristband. FIG. 7 illustrates an embodiment with this PCB design, shown as a side cross-sectional view. Metal frame 701, which may for example be a stamped metal part, forms the bottom and sides of the antenna loop. Printed circuit board 702, formed for example on an FR-4 substrate, has a conductive surface with regions 704 and 703 on opposite sides of slot 111. RFID chip 501 is mounted on the inner side of board 702, which faces the inner core of the antenna loop. Similarly capacitor 502 is mounted on this inner side of board 702. (Note that capacitor 502 may also be disposed across the slot 111, but the slot location for the capacitor is not visible in this cross-section view.) Because all components are mounted on the inside of the antenna, they are protected even if the outer edges of the RFID tag contact people or objects. Furthermore, since the outer edges of the RFID tag in one or more embodiments are flat, packaging and mounting are simplified.

In one or more embodiments, the RFID tag may be fabricated, for example, from a thick PCB material. The antenna may be formed from multiple conductive surfaces of the PCB itself, potentially eliminating the need for a stamped metal part for the antenna. FIGS. 8A and 8B illustrate an embodiment with an antenna design as in FIG. 4C, where the antenna is formed from a thick double-sided PCB board. FIG. 8A shows a top view of this embodiment, and FIG. 8B shows a cross-sectional side view. The side view 8B shows that the interior of the tag is the PCB substrate 820, which may be for example FR-4. This substrate therefore forms the antenna core, rather than the air core as illustrated for example in FIG. 1. The top surface 821 and bottom surface 822 of the PCB form part of the antenna loop. The top surface 821 corresponds to antenna surface 401, which has slots 420 and 421. Multiple mounting positions are provided across slot 420 for capacitor 502, specifically positions 802a, 802b, 802c, 802d, 802e, and 802f. Multiple mounting positions are also provided for radio frequency element 501 in the interior area within slot 421. These radio frequency element mounting positions each include a first attachment point to the top surface 821 and a second attachment point to a via that connects the terminal to the bottom PCB surface 822. Four mounting positions are shown: 801a (top surface) and 811a (bottom surface), 801b (top surface) and 811b (bottom surface), 801c (top surface) and 811c (bottom surface), and 801d (top surface) and 811d (bottom surface). Attachment point 811a connects to via 831a that connects to bottom surface 822; similarly 811b connects to via 831b, 811c connects to 831c, and 811d connects to 831d. The mounting position shown for RFID chip 501 attaches to top surface 821 at 801c, and to 811c which connects to the bottom surface 822 through via 831c. In this design as shown the components are attached to the top of the PCB, rather than on the interior as in FIG. 7 where the air core permits components to be on the inside of the antenna. Any number of mounting positions may be utilized for radio frequency components and electrical components in any embodiment of the invention described herein.

Instead of or in addition to using a rigid PCB, such as the PCB shown in FIG. 7 and the (thick) PCB shown in FIGS. 8A and 8B, one or more embodiments may use a circuit board that is for example a flexible PCB or a substrate printed with conductive ink. For example the antenna and the circuit connections may be formed partially or completely from a conductive ink that is an overlay over a flexible material such as a plastic. In one or more embodiments, the capacitor may be replaced by, for example, a capacitance formed within the circuit board itself, or a capacitor formed by additional area of a flexible PCB. One or more embodiments may include elements or configurations that provide for adjustment this parasitic capacitance formed within the circuit, in order to tune the resonant frequency of the antenna. This adjustment of capacitance (and hence of resonant frequency) enables tuning of the system without having to change the art work for the printed circuit.

FIG. 23 illustrates an embodiment with conductive ink overlaid onto a flexible material such as for example, without limitation, Mylar®. A strip 2301 of flexible material is overlaid in step 2302 with a conductive ink, using for example a printed circuit process that deposits the conductive ink on the material 2301 in any desired pattern based on the circuit art work. The conductive ink 2303, shown in black in FIG. 23, may be of any desired size, shape, thickness, and pattern. For example, it may include a slot 2304 across which an RFID chip may be mounted, similar to the slot described above for rigid circuits. After the overlay of the conductive ink 2303, the flexible circuit is wrapped in step 2305 to form a loop antenna. FIG. 23 shows a side view of this wrapped circuit 2306. In addition to being wrapped in a loop shape, the wrapped circuit includes an area of overlap between the two conductive ends of the strip. This overlapping area may generate a parasitic capacitance 2307 that may contribute to the resonant frequency of the loop antenna. In one or more embodiments, the amount of parasitic capacitance 2307 may be adjusted, for example by changing the extent to which the two edges of the strip are overlapped. The capacitance formed by overlapping the edges of the strip makes the device effectively electrically bigger on the inside (via the capacitance), even though it is physically smaller because the enclosed volume may be small. The core 2308 of the wrapped loop may be formed without any other material, or may be formed from any material or materials, including for example a hollow piece of plastic, block of foam, or a frame made of plastic around which the strip 2301 is wrapped.

FIGS. 24A and 24B illustrate a variant of the embodiment shown in FIG. 23. As in FIG. 23, this embodiment uses a conductive ink overlay over a flexible material, which is wrapped into a loop shape. FIG. 24A shows a top view of this embodiment before it is wrapped into a loop, and FIG. 24B shows a side view of the embodiment wrapped into a loop antenna shape. In this embodiment, the strip material 2401 near the left edge 2411 has no conductive ink overlaid onto it; instead it may have an adhesive on it that allows the strip to secure to itself when it is wrapped around a frame or around a core material. The conductive ink begins at edge 2412 and extends to edge 2414, with slot 2304 across which the RFID chip may be mounted. (As in previously described embodiments, multiple mounting locations may be provided for the RFID chip.) After position 2415, the conductive ink narrows into a smaller width region. This region between 2415 and 2414 overlaps with the opposite edge of the strip when wrapped, forming the parasitic capacitance. By narrowing the conductive ink in this region, the capacitor fringing fields on the edge of the conductive region stay inside the device, so that the electric field of the device is not lossy. Other embodiments may utilize any shape in this region, from the edges inward for example.

FIG. 24B shows a side view of the embodiment of FIG. 24A when wrapped around a frame. The frame may for example include four cylindrical posts 2421, 2422, 2423, and 2424 around which the strip is wrapped. The portion 2401 of the strip prior to the beginning 2412 of the conductive ink may have an adhesive on the surface that secures the strip to itself around the frame. The overlapping area of the conductive ink, which forms parasitic capacitance, is the region between location 2414 and 2415. In one or more embodiments, it may be possible to adjust the capacitance by changing the effective area of this overlap. For example, the device may be trimmed by cutting off the strip prior to the edge 2414, thereby shortening the amount of overlap. FIG. 24A illustrates another adjustment approach that may be used in one or more embodiments. The conductive ink region between 2415 and 2414 contains a series of narrow conductive bridges 2413a, 2413b, 2413c, 2413d, and 2413e. The effective capacitance can be changed by disconnecting 2402 any one of these bridges, which disconnects the far edge of the conductive ink from the rest of the circuit. For example, in FIG. 24A bridge 2413 is severed, so that region 2432 in FIG. 24B does not effectively contribute to the parasitic capacitance; the effective capacitance 2431 therefore depends on the area between location 2413c and 2415. This adjustment mechanism may be used to tune the capacitance of the system without any change to the artwork for the printed circuit. It also does not require any additional components such as a discrete capacitor.

Computer Simulations of Antenna Performance

Computer simulations of two illustrative embodiments of the invention were performed. The first simulation was of an embodiment similar to that depicted in FIGS. 8A and 8B, which we refer to as a "Type 1 tag." The second simulation was of an embodiment similar to that depicted in FIG. 7, which we refer to as a "Type 2 tag." The Type 1 tag has a thick PCB core, while the Type 2 tag has an air core. All computer simulations were done using CST Microwave Studio®. The simulations modeled an RFID tag mounted on a human wrist. The frequency of operation modeled is 902-928 MHz, an ISM band common for RFID operation.

Figure 9:
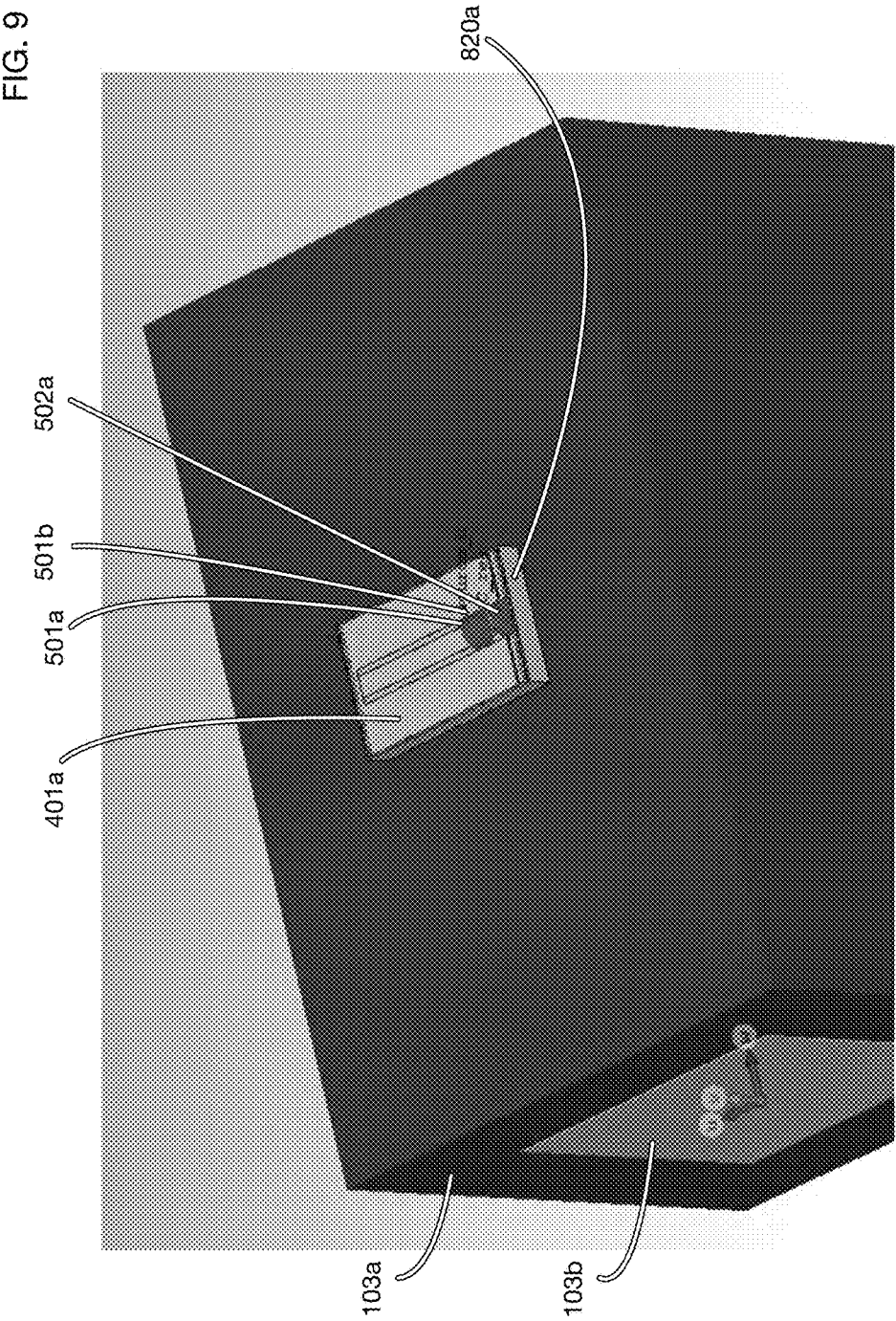
FIG. 9 shows a model of the tag design of FIGS. 8A and 8B attached to a human wrist; this model is used for computer simulations of antenna performance.

FIG. 9 shows the configuration for the computer simulations of the Type 1 tag. The PCB has an FR-4 core 820a and an upper surface 401a (shown in yellow) that is part of the loop antenna. The RFID chip is modelled as a source 501a (in red) with an impedance of 64-ohms, with a series capacitance 501b (in blue) of 0.81 pF. The resonator capacitor 502a (in blue) is 2.2 pF. The human wrist model includes a human flesh model 103a (in dark red) and a bone model 103b (in grey). There is a 0.020-in. air gap between the loop antenna and the "wrist."

Figure 10:
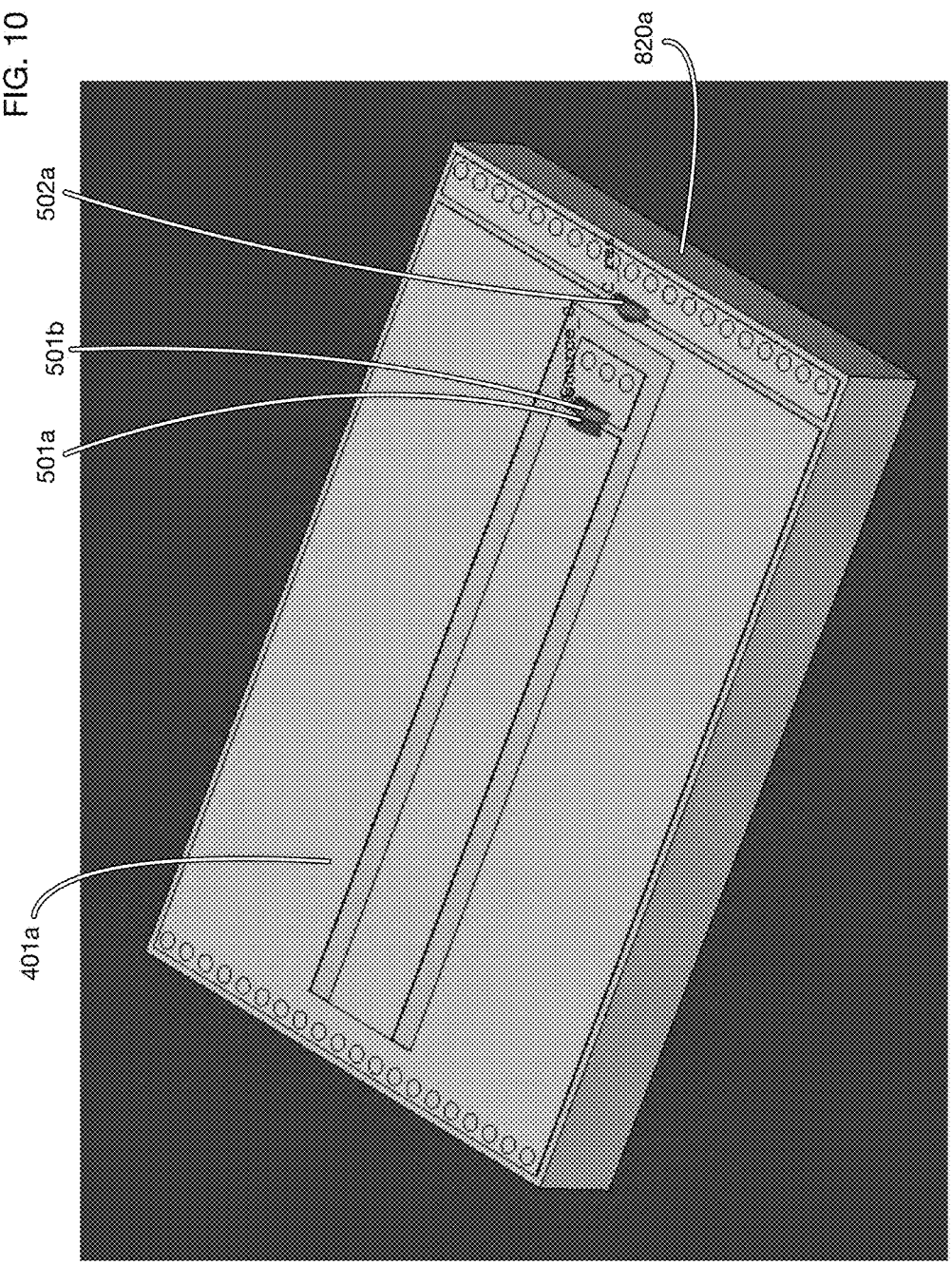
FIG. 10 shows a close-up view of the tag in the model of FIG. 9.

FIG. 10 shows a close-up view of the PCB model of FIG. 9 with FR-4 PCB core 820a, upper conductive surface 401a of the antenna, RFID chip source 501a, series capacitance 501b of the RFID chip, and resonator capacitor 502a.

Figure 11:
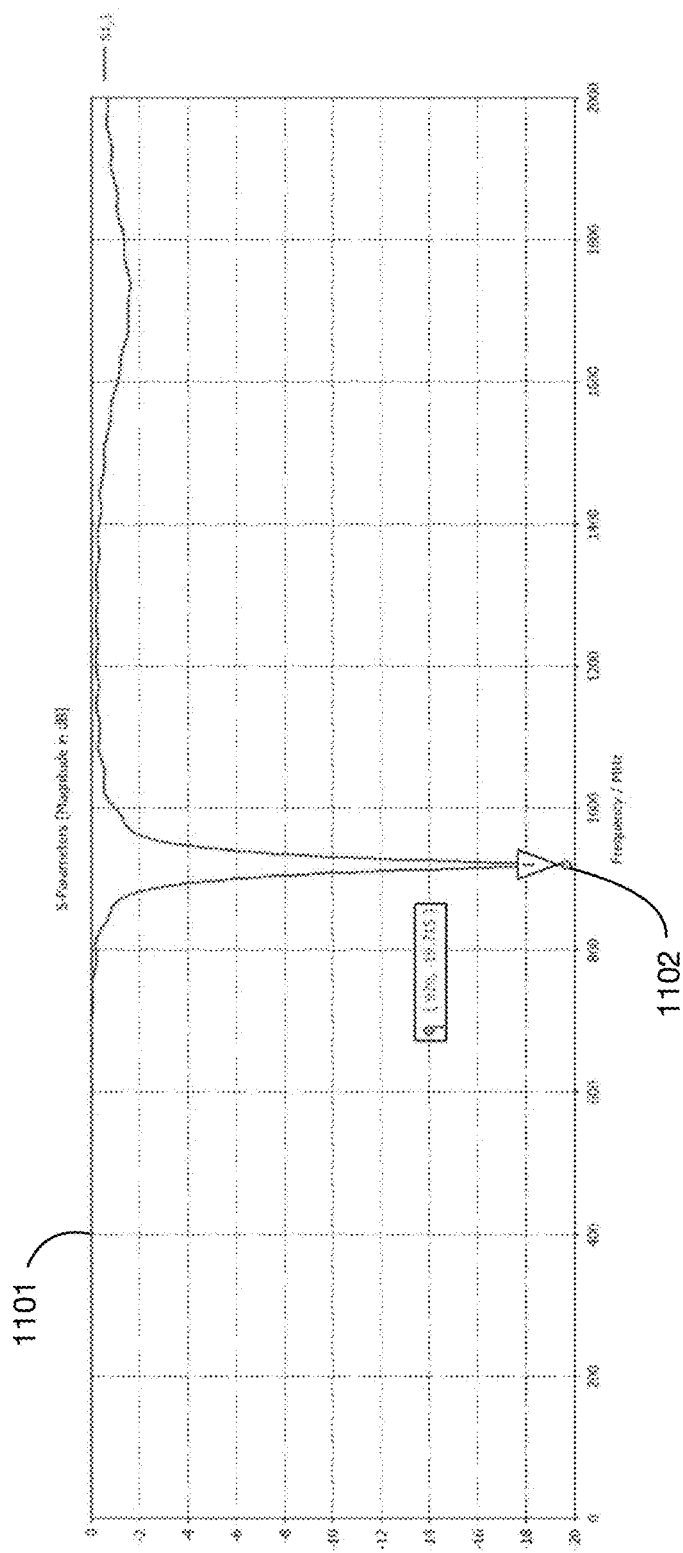
FIG. 11 shows the return loss as seen by the RFID chip in the model of FIG. 9.

FIG. 11 shows the return loss 1101 as seen by the RFID chip, showing the impedance matching 1102 at frequency 920 MHz.

Figure 12:
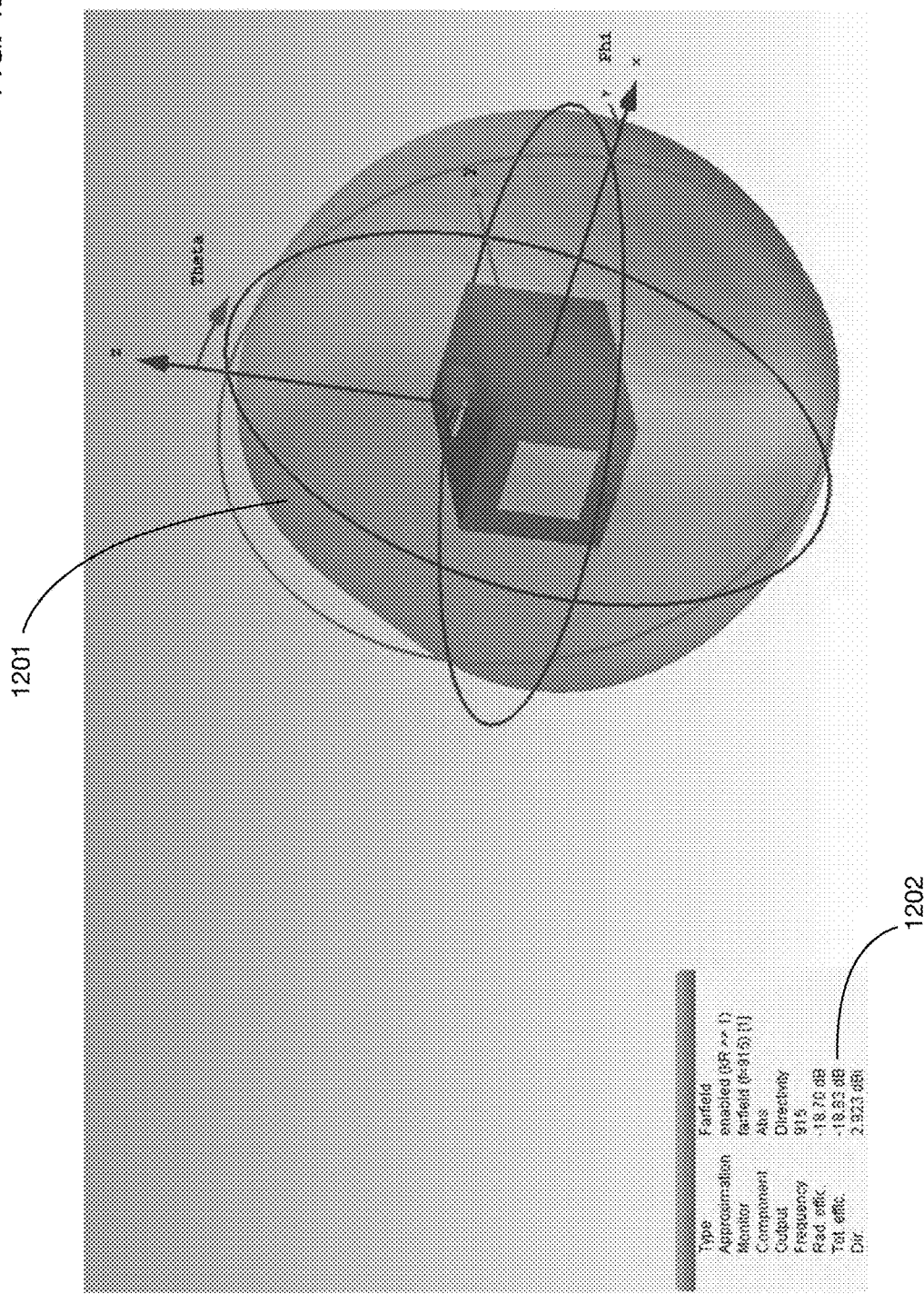
FIG. 12 shows the radiation pattern calculated for the model of FIG. 9.

FIG. 12 shows the radiation pattern 1201 for the Type 1 tag. The total efficiency 1202 (−18.8 dB) is about 7 dB lower than that of the Type 2 tag (discussed below). This difference in efficiency is due to the loss in the FR-4 material in the core of the Type 1 tag (whereas the Type 2 tag has an air core).

Figure 13:
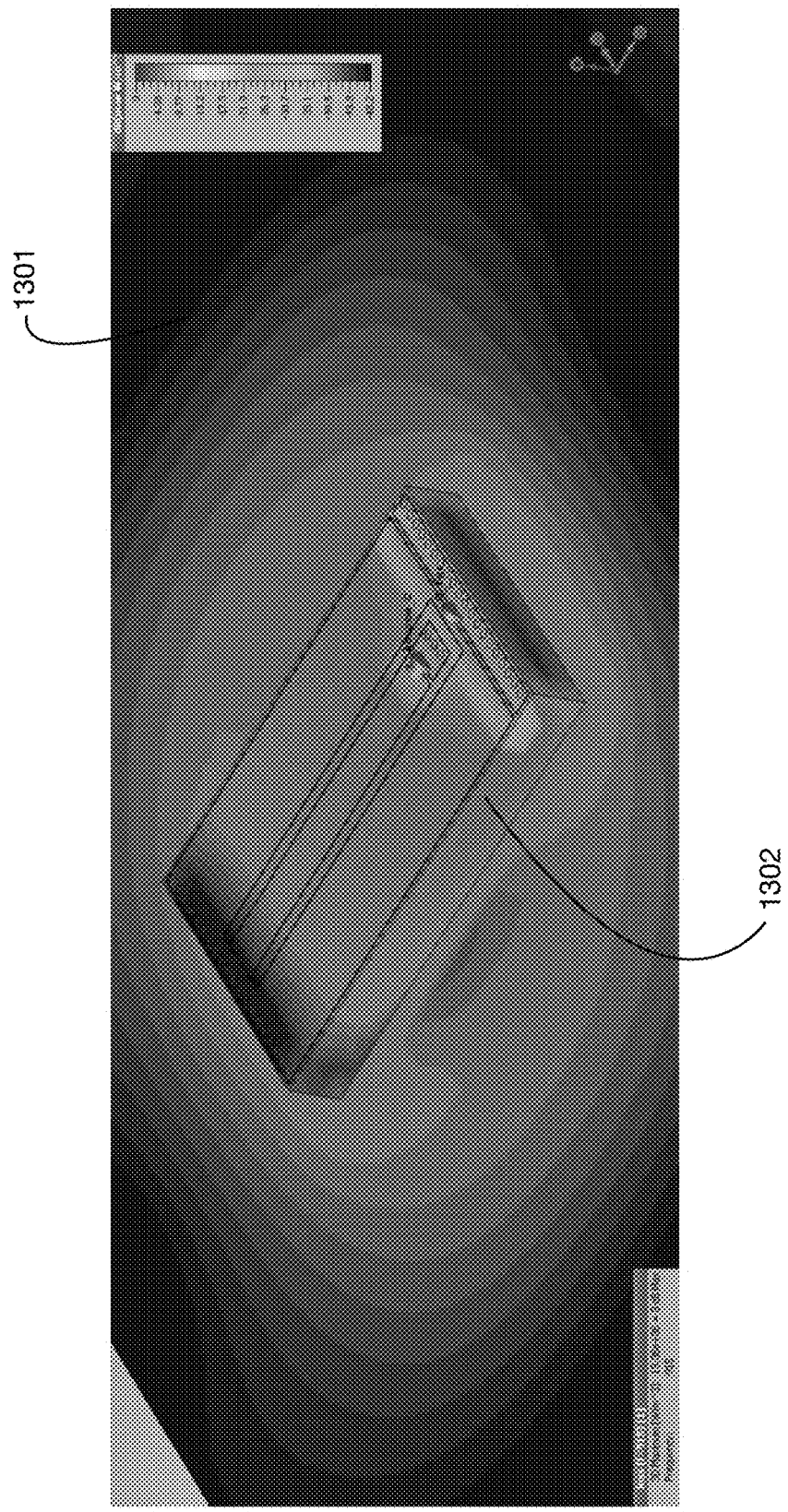
FIG. 13 shows power losses calculated for the model of FIG. 9.

FIG. 13 shows the power losses 1301 of the Type 1 tag, illustrating that a significant portion of the tag losses (not human body losses) occur in the FR-4 substrate material 1302.

Figure 14:
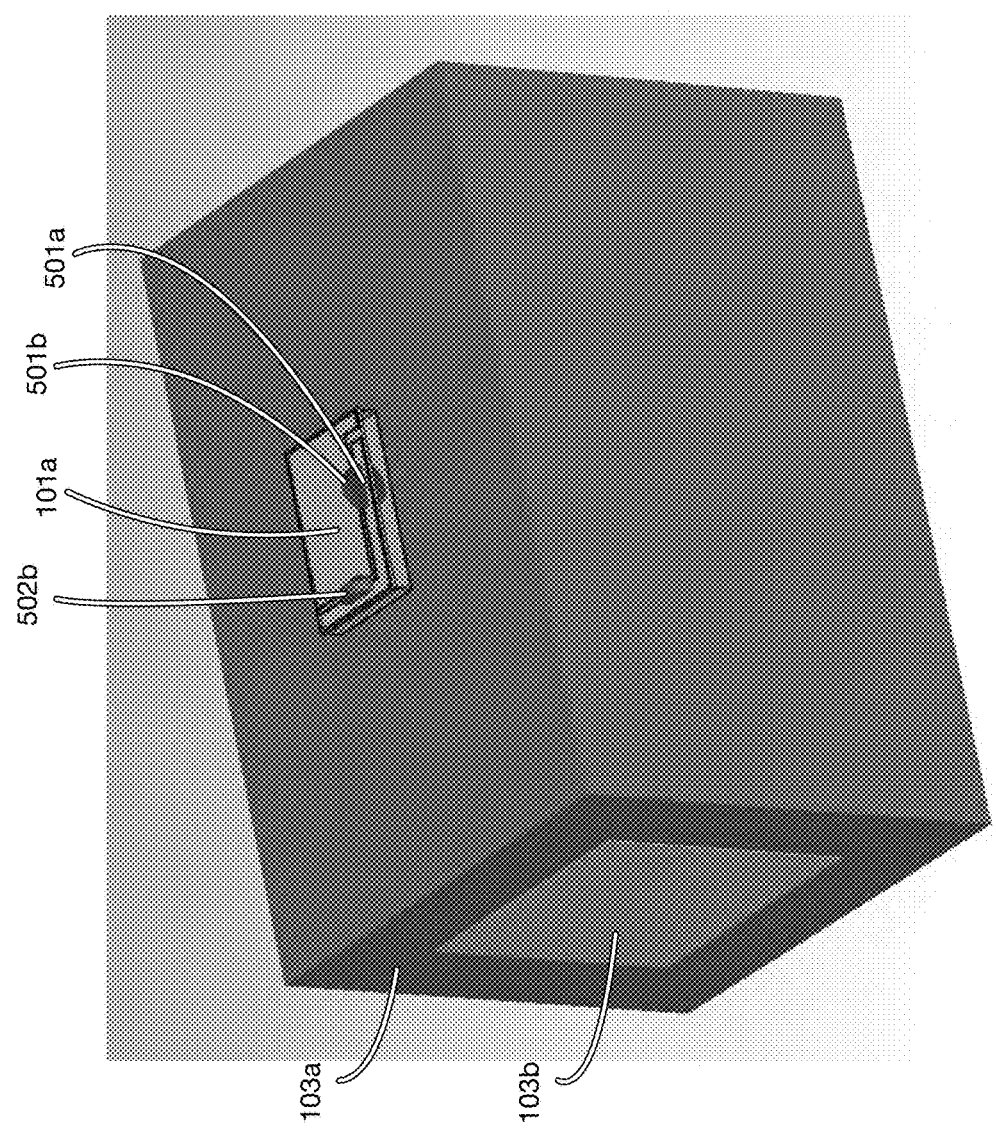
FIG. 14 shows a model of the tag design of FIG. 7 attached to a human wrist; this model is used for computer simulations of antenna performance.

Turning now to simulations of the Type 2 tag, FIG. 14 shows the configuration for the computer simulations of the Type 2 tag. The upper surface of the antenna is formed from a PCB, with components installed on the bottom (inner) surface, as illustrated in FIG. 7. The lower portion of the antenna is a metal part, surrounding an air core. The upper surface 101a of the antenna (in yellow) has a multi-segment slot. The RFID chip is modelled as a source 501a (in red) with an impedance of 64-ohms, with a series capacitance 501b (in blue) of 0.81 pF. The resonator capacitor 502b (in blue) is 4.5 pF. The human wrist model includes a human flesh model 103a (in dark red) and a bone model 103b (in grey). There is a 0.020-in. air gap between the loop antenna and the "wrist."

Figure 15:
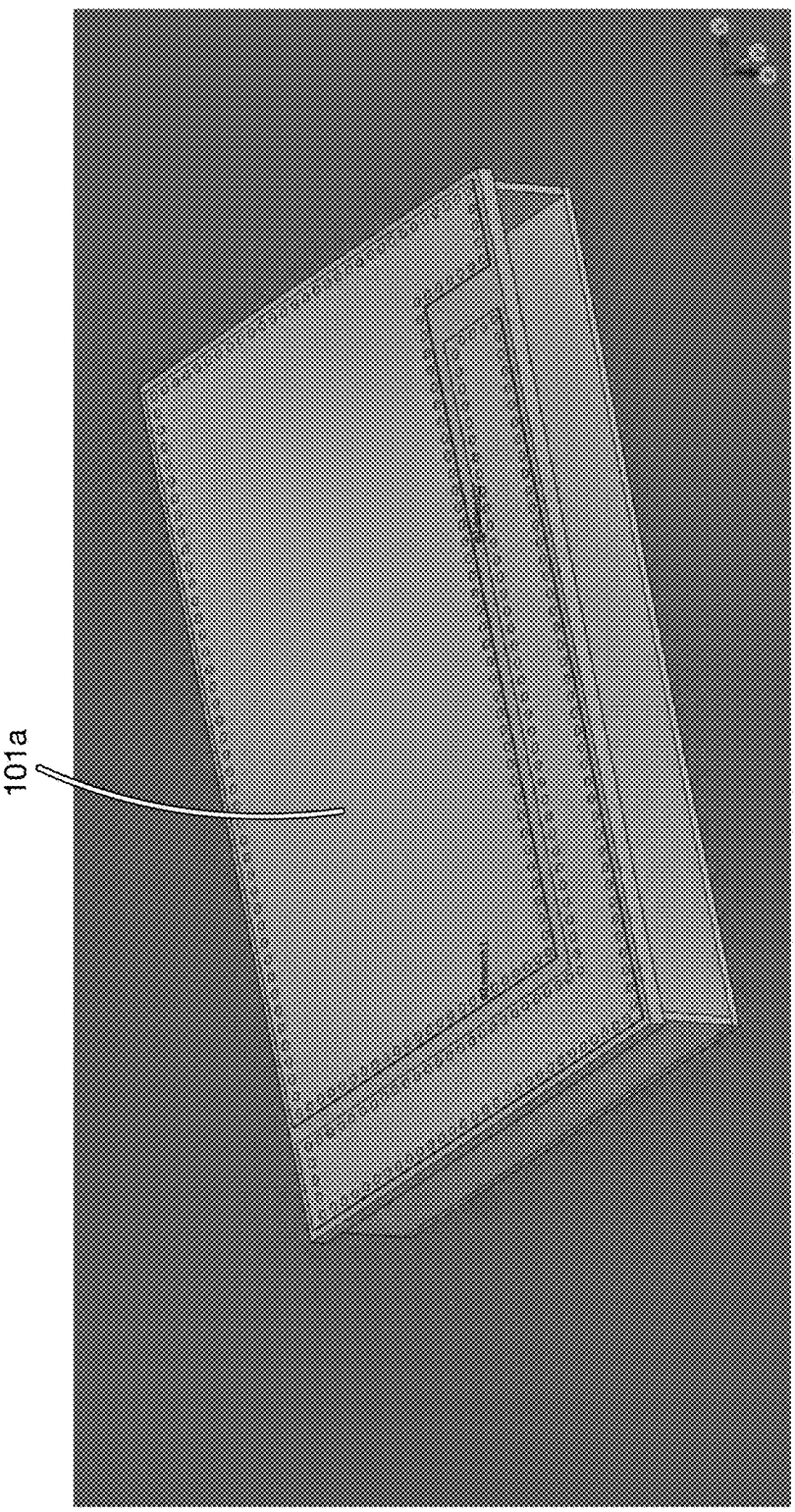
FIG. 15 shows a close-up view of the tag in the model of FIG. 14.

FIG. 15 shows a close-up view of the Type 2 tag shown in FIG. 14. The upper surface 101a is visible, but the RFID chip and the capacitor are not visible because they are on the bottom of the board (facing the inner air core of the antenna).

Figure 16:
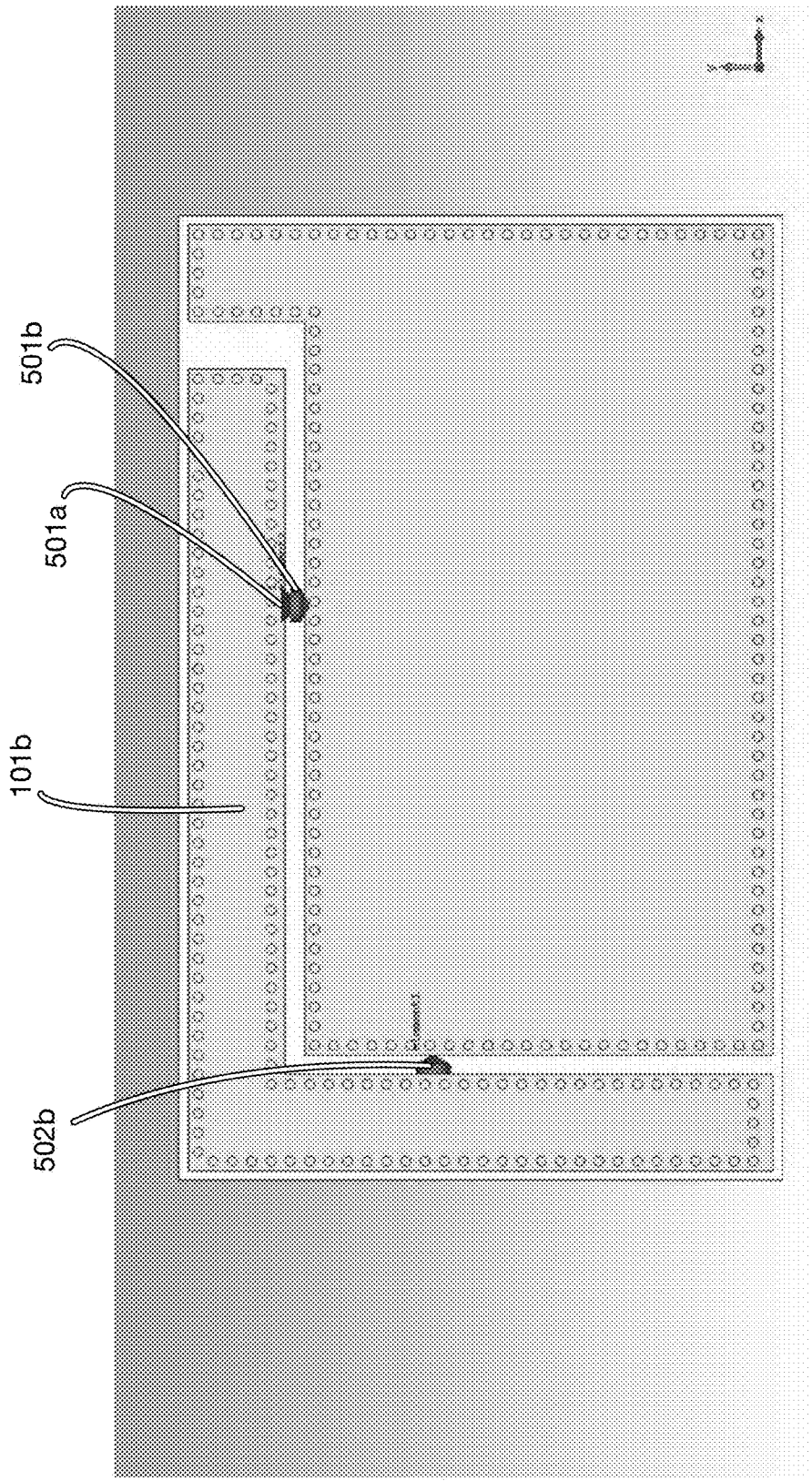
FIG. 16 shows the PCB of FIG. 16 as viewed from the bottom, showing the components mounted to the lower PCB surface.

FIG. 16 shows a close-up view of the bottom 101b of the PCB. The RFID chip (501a and 501b) and the capacitor (502b) are shown in the optimal positions as calculated by simulation.

Figure 17:
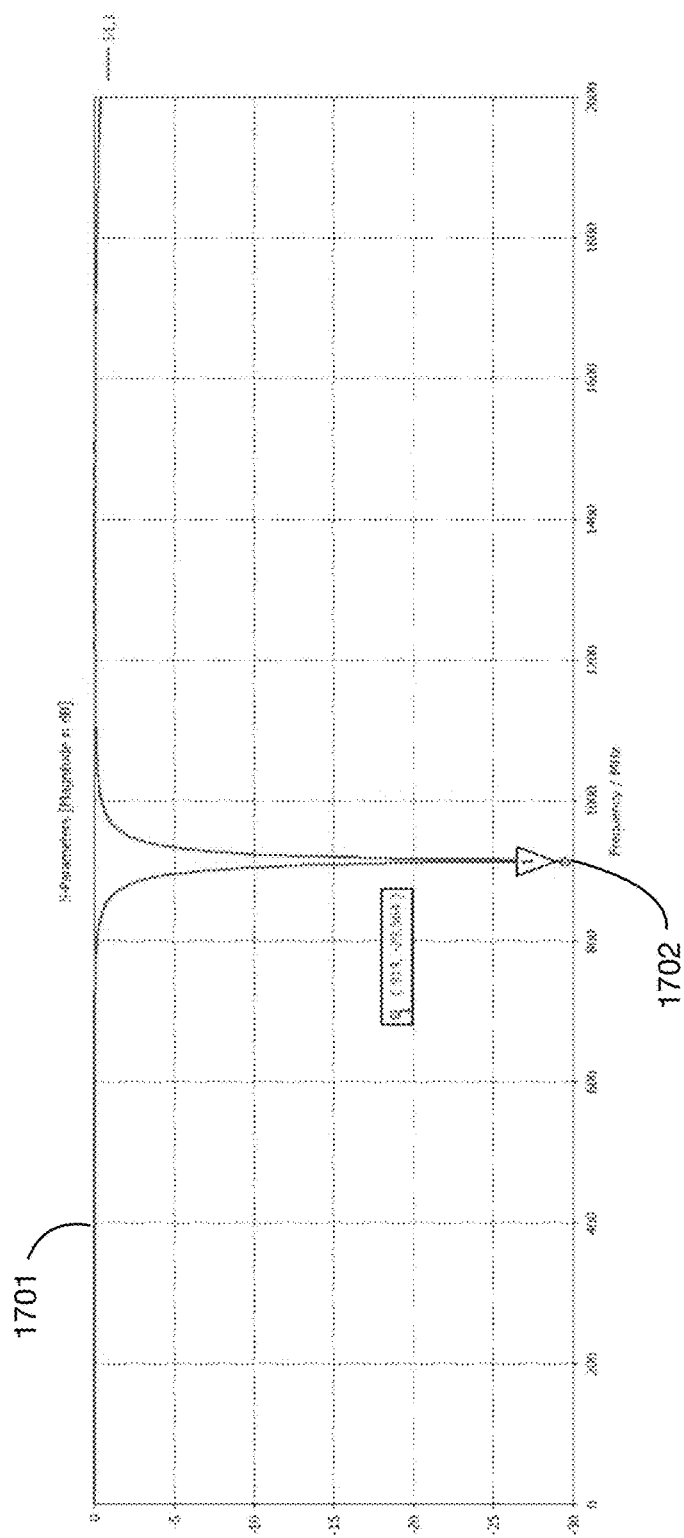
FIG. 17 shows the return loss as seen by the RFID chip in the model of FIG. 14.

FIG. 17 shows the return loss 1701 as seen by the RFID chip, showing the impedance matching 1702 at frequency 914 MHz.

Figure 18:
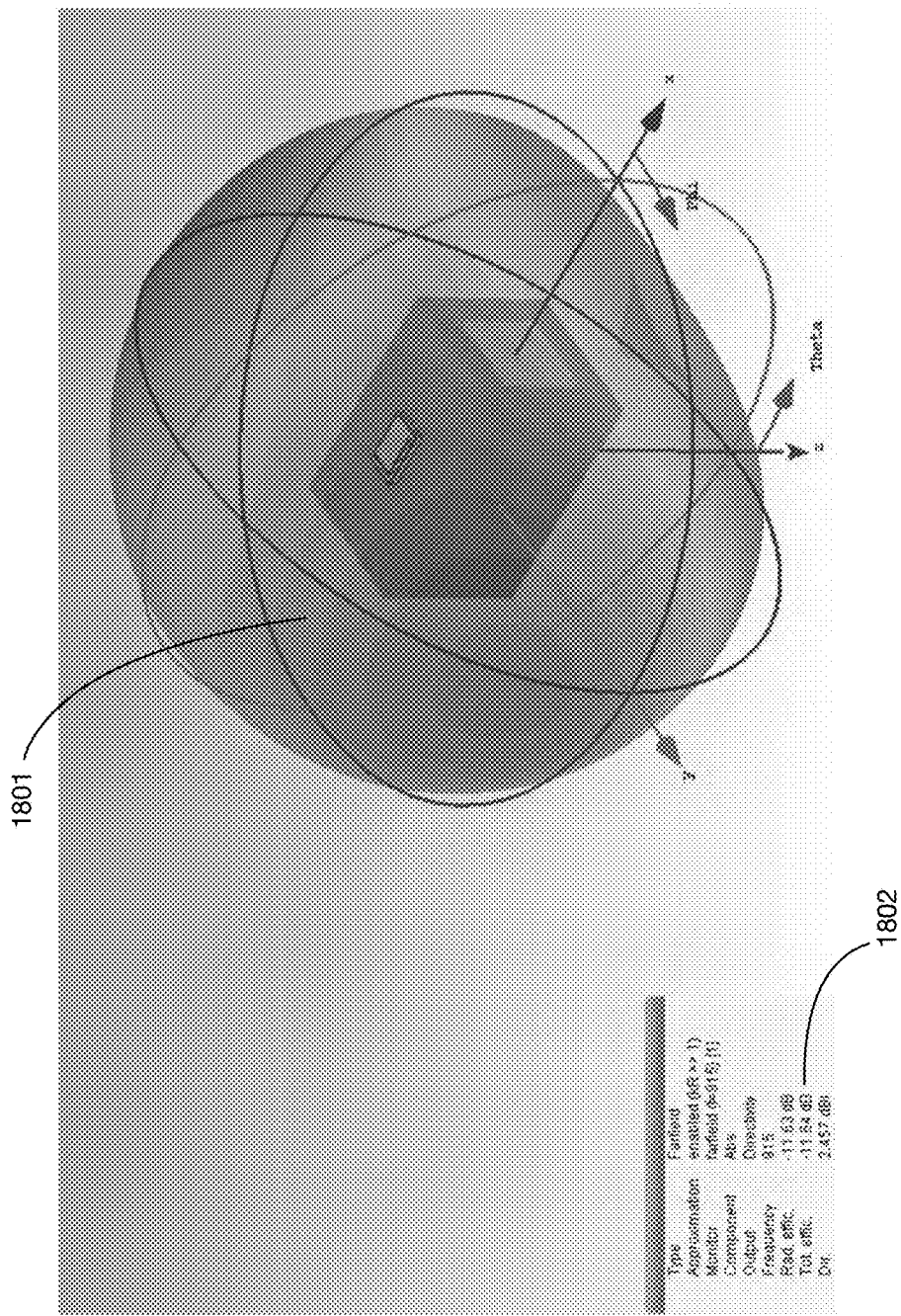
FIG. 18 shows the radiation pattern calculated for the model of FIG. 14.

FIG. 18 shows the radiation pattern 1801 for the Type 2 tag. The total efficiency 1802 (−11.6 dB) is about 7 dB higher than that of the Type 1 tag (discussed above). This difference in efficiency is due to the loss in the FR-4 material in the core of the Type 1 tag (whereas the Type 2 tag has an air core).

Figure 19:
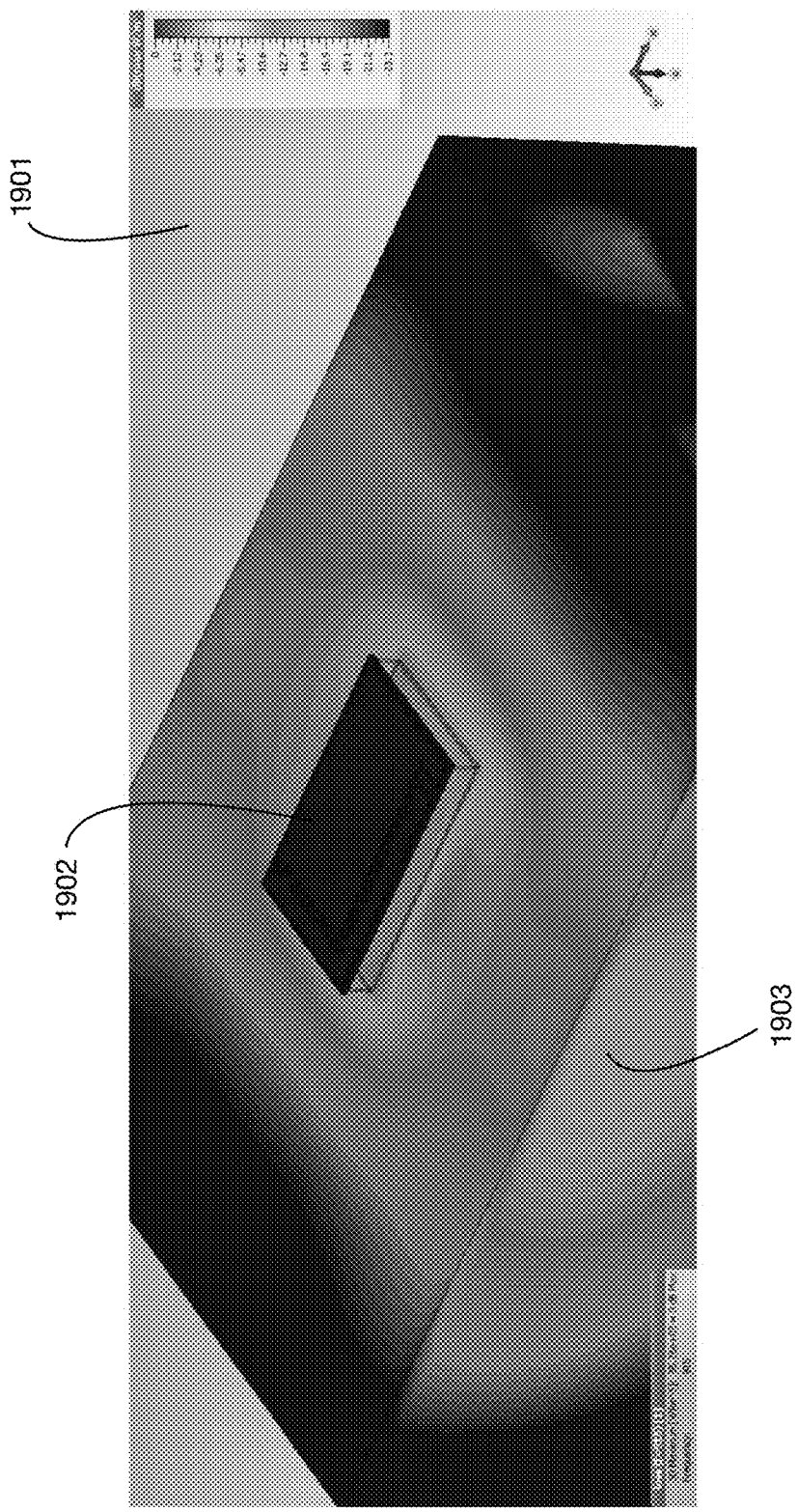
FIG. 19 shows power losses calculated for the model of FIG. 14.

FIG. 19 shows the power losses 1901 of the Type 2 tag. This simulation shows that the losses 1903 in the human body are much greater than the losses 1902 in the tag itself. This tag uses a thin (0.025-in.) FR-4 substrate, with very little of the associated electric fields contained therein. This is the reason that the Type 2 tag is about 7 dB more efficient than the Type 1 tag.

Physical Realizations

Physical models of a Type 1 tag and of a Type 2 tag have been constructed and tested. The RFID chip used in the physical models is a Higgs™ 3 single chip UHF RFID Tag integrated circuit made by Alien Technology LLC. As in the computer models described above, the Type 1 tag physical model is an FR-4-core tag, and the Type 2 tag physical model is an air-core tag.

The Type 1 tag physical realization is based on a 0.125-inch thick FR-4 (fiberglass) printed circuit board. The weight of this tag is 3 grams. The Type 2 tag physical realization combines a 0.025-inch thick FR-4 printed circuit board with a formed brass antenna. The brass material used is 0.010-inch thick. The overall size of the Type 2 tag realization is about the same as the overall size of the Type 1 tag realization. The weight of the Type 2 tag physical realization is 2 grams; it is lower than the weight of the Type 1 tag realization because the core is air rather than FR-4 fiberglass. The dimensions of both tag realizations (see FIG. 2 for reference) are approximately w=1.0-inch, h=0.125-inch, d=0.625-inch.

Physical Testing Results

Testing was performed on Type 2 tags over a variety of capacitor values and capacitor mounting locations. All testing was done on a human wrist, and the distance over which the tag was readable was measured. A typical RFID reader was employed, along with typical patch antennas, one per each of two reader ports.

Figure 20:
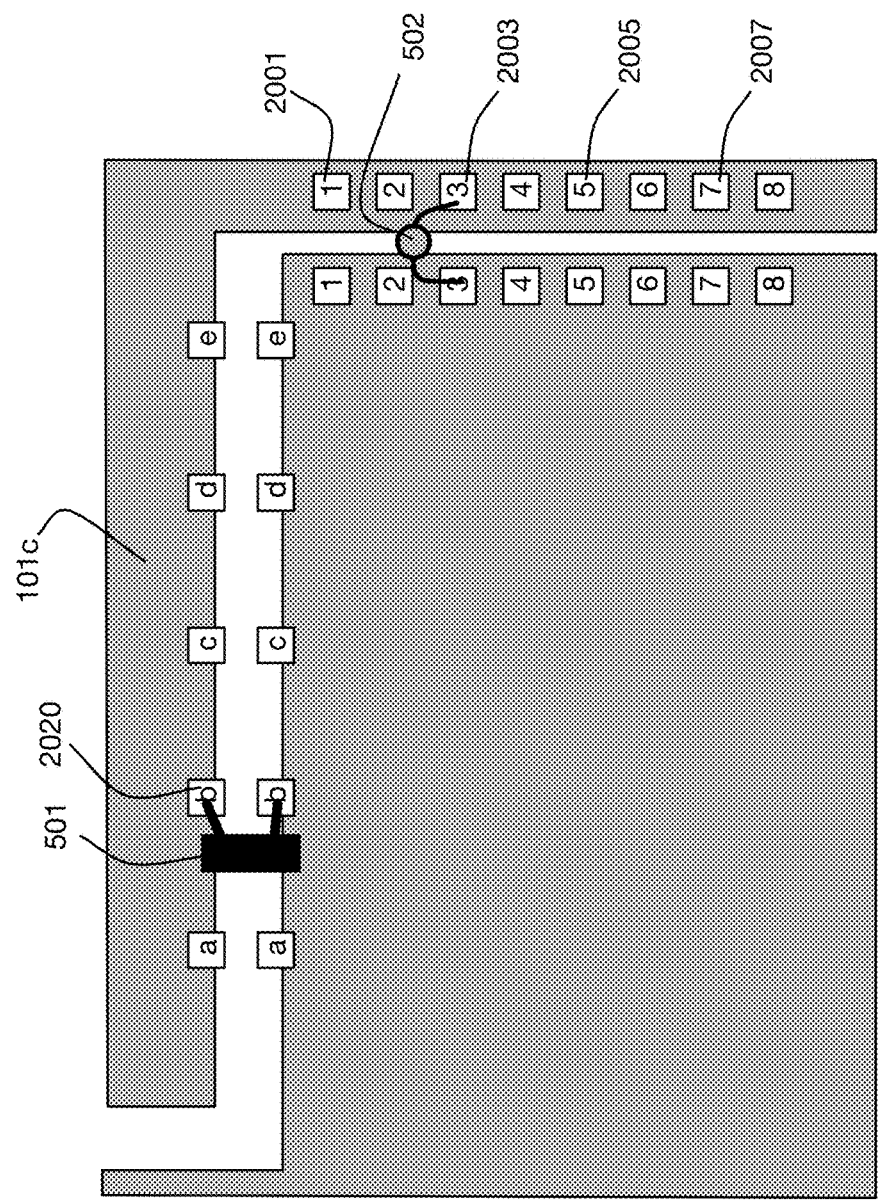
FIG. 20 shows the configuration of a tag used for tests of the effect of changes in capacitor mounting location on read distance.

FIG. 20 illustrates the capacitor mounting locations tested on a Type 2 tag PCB. Surface 101c is the top surface of the PCB; for the test the components were mounted to the top of the PCB for simplicity, although for a Type 2 tag they may also be mounted on the bottom surface. Of the five mounting locations on this PCB for the RFID chip 501, location 2020 ("b") was used throughout the tests. The test PCB has 8 mounting locations for resonating capacitor 502; of these 8 locations, 4 locations (2001 ("1"), 2003 ("3"), 2005 ("5"), and 2007 ("7")) were used for the tests. Tests were performed with capacitors of capacitance 3.3 pF and of 3.6 pF. Two test runs were performed for each capacitor value.

Figure 21:
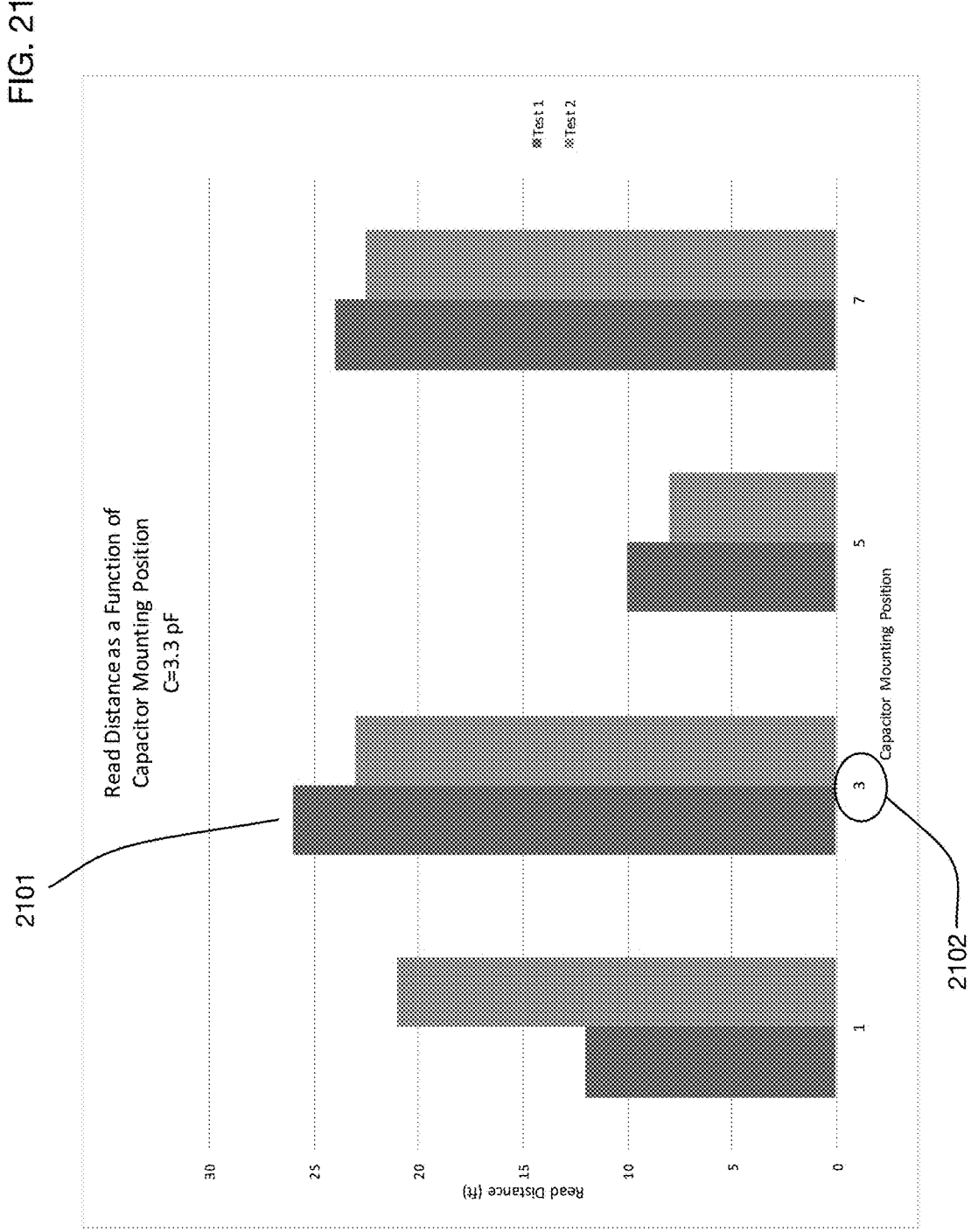
FIG. 21 shows results of read distance tests for the tag of FIG. 20 with a resonating capacitor of 3.3 pF.

FIG. 21 shows results of the test runs for the capacitor with capacitance 3.3 pF. This graph shows that read distance varies significantly as a function of the capacitor mounting location, as expected. The peak read distance 2101 occurred at mounting location 2102 (location "3") for both tests.

FIG. 22 shows results of the test runs for the capacitor with value 3.6 pF. For this capacitor, the peak read distance 2201 occurred at mounting location 2202 (location "7") for both tests.

Thus these tests demonstrate that embodiments of the invention can accommodate different capacitor values, or other changes such as the dimensions of the loop antenna, by changing the capacitor mounting location.

Testing of the Type 2 tag on a human wrist against several commercially available tags showed that it had a higher read-range than all tags tested except for one. The Type 2 tag tested has a volume of about 1200 cubic mm and a weight of 3 grams. The one commercially available tag that had a similar read range had a volume of 26,400 cubic mm and a weight of 24 grams. Thus, the present invention provides superior performance when volume and weight are taken into account than any tags tested.

When the height of a Type 2 tag is increased by increasing the height of the loop antenna, its read range is increased without significantly adding weight. Tests of the Type 2 tag showed that by increasing height from about ⅛-in. To ¼-in., the read range increased approximately 50%.

While the invention herein disclosed has been described by means of specific embodiments and applications thereof, numerous modifications and variations could be made thereto by those skilled in the art without departing from the scope of the invention set forth in the claims.

What is claimed is:

1. A long-range, surface-insensitive passive RFID tag comprising:

a loop antenna comprising a tubular sheet of conductive material, having a central axis extending through a core enclosed by said tubular sheet, wherein
said loop antenna is configured to be mounted on or proximal to a surface of an object;
said central axis is substantially parallel to said surface of said object when said loop antenna is mounted on or proximal to said surface of said object;
a cross section of said tubular sheet along a plane perpendicular to said central axis is an open loop that is perpendicular to said surface of said object;
said cross section has a width along an axis parallel to said surface of said object and has a height along an axis perpendicular to said surface of said object;
said tubular sheet has a depth along said central axis;
said tubular sheet has a slot extending along a surface of said tubular sheet; and,
a radio frequency element coupled to said loop antenna and configured to receive signals from said loop antenna;
wherein
said tubular sheet comprises a plurality of radio frequency element mounting locations for said radio frequency element;
each radio frequency element mounting location of said plurality of radio frequency element mounting locations comprises at least two connections to said tubular sheet; and,
an impedance of said loop antenna to said radio frequency element varies based on which radio frequency element mounting location of said plurality of radio frequency element mounting locations is used to attach said radio frequency element to said tubular sheet.

2. The long-range, surface-insensitive passive RFID tag of claim 1, wherein
said plurality of radio frequency element mounting locations lie along said slot;
said slot comprises sides; and,
each radio frequency element mounting location of said plurality of radio frequency element mounting locations comprises at least one connection to said tubular sheet on each side of said sides of said slot.

3. The long-range, surface-insensitive passive RFID tag of claim 1, wherein said loop antenna encloses an air core.

4. The long-range, surface-insensitive passive RFID tag of claim 1, wherein said cross section is substantially rectangular.

5. The long-range, surface-insensitive passive RFID tag of claim 1, wherein said slot is a straight line segment.

6. The long-range, surface-insensitive passive RFID tag of claim 1, wherein said slot is not a straight line segment.

7. The long-range, surface-insensitive passive RFID tag of claim 6, wherein said slot comprises
a plurality of connected line segments, wherein not all line segments of said plurality of connected line segments are collinear.

8. The long-range, surface-insensitive passive RFID tag of claim 7, wherein said plurality of connected line segments comprises
a first line segment; and,
a second line segment connected to said first line segment and substantially perpendicular to said first line segment.

9. The long-range, surface-insensitive passive RFID tag of claim 8, further comprising a third line segment connected to said second line segment and substantially perpendicular to said second line segment.

10. The long-range, surface-insensitive passive RFID tag of claim 1, wherein
said loop antenna comprises a parasitic capacitance between a first section of said tubular sheet that overlaps a second section of said tubular sheet and
said parasitic capacitance affects a resonant frequency of said loop antenna.

11. The long-range, surface-insensitive passive RFID tag of claim 10, wherein said parasitic capacitance is adjusted by trimming a length of said long-range, surface-insensitive passive RFID tag.

12. The long-range, surface-insensitive passive RFID tag of claim 10, wherein
said tubular sheet has one or more conductive bridges connecting said loop antenna to one or both of said first section and said second section; and,
said parasitic capacitance is adjusted by disconnecting one of said one or more conductive bridges.

13. The long-range, surface-insensitive passive RFID tag of claim 10, wherein said tubular sheet of conductive material further comprises an overlay of a layer of conductive ink onto a flexible material.

14. The long-range, surface-insensitive passive RFID tag of claim 1, further comprising
a passive component coupled to said loop antenna and configured to affect a resonant frequency of said loop antenna;
wherein
said tubular sheet further comprises a plurality of passive component mounting locations for said passive component;
said plurality of passive component mounting locations lie along said slot;
said slot comprises sides;
each passive component mounting location of said plurality of passive component mounting locations comprises at least one connection to said tubular sheet on each side of said sides of said slot; and,
said resonant frequency of said loop antenna varies based on which passive component mounting location of said plurality of passive component mounting locations is used to attach said passive component to said tubular sheet.

15. The long-range, surface-insensitive passive RFID tag of claim 14, wherein said passive component comprises a capacitor.

16. The long-range, surface-insensitive passive RFID tag of claim 14, wherein said passive component comprises an inductor.

17. The long-range, surface-insensitive passive RFID tag of claim 14, wherein said passive component comprises a resistor.

18. The long-range, surface-insensitive passive RFID tag of claim 14, wherein said radio frequency element and said passive component are attached to an interior surface of said tubular sheet.

19. The long-range, surface-insensitive passive RFID tag of claim 1, further comprising:
a mount configured to couple said long-range, surface-insensitive passive RFID tag to metal.

20. The long-range, surface-insensitive passive RFID tag of claim 1, further comprising:
a mount configured to couple said long-range, surface-insensitive passive RFID tag to flesh.

21. The long-range, surface-insensitive passive RFID tag of claim 1, further comprising a printed circuit board, wherein at least a portion of said tubular sheet comprises a conductive layer on said printed circuit board.

22. The long-range, surface-insensitive passive RFID tag of claim 21, wherein
said tubular sheet further comprises a top conductive layer on a top side of said printed circuit board and a bottom conductive layer on a bottom side of said printed circuit board.

23. The long-range, surface-insensitive passive RFID tag of claim 22, wherein
each radio frequency element mounting location of said plurality of radio frequency element mounting locations comprises a connection to said top conductive layer and a connection to said bottom conductive layer.

24. The long-range, surface-insensitive passive RFID tag of claim 1, wherein said height is less than or equal to 0.25 inches.

25. The long-range, surface-insensitive passive RFID tag of claim 1, wherein said height is less than or equal to 0.15 inches.

26. The long-range, surface-insensitive passive RFID tag of claim 1, wherein said open loop has an enclosed area greater than or equal to 0.1 square inches.

27. The long-range, surface-insensitive passive RFID tag of claim 1, wherein said open loop has an enclosed area greater than or equal to 0.15 square inches.

28. The long-range, surface-insensitive passive RFID tag of claim 1, wherein said depth is greater than or equal to 0.4 inches.

29. The long-range, surface-insensitive passive RFID tag of claim 1, wherein said depth is greater than or equal to 0.6 inches.

30. A long-range, surface-insensitive passive RFID tag comprising
a loop antenna comprising a tubular sheet of conductive material, having a central axis extending through a core enclosed by said tubular sheet, wherein
said loop antenna is configured to be mounted on or proximal to a surface of an object;
said central axis is substantially parallel to said surface of said object when said loop antenna is mounted on or proximal to said surface of said object;
a cross section of said tubular sheet along a plane perpendicular to said central axis is an open loop that is perpendicular to said surface of said object;
said cross section has a width along an axis parallel to said surface of said object and has a height along an axis perpendicular to said surface of said object;
said tubular sheet has a depth along said central axis; and,
said tubular sheet has a slot extending along a surface of said tubular sheet, wherein said slot comprises a plurality of connected line segments,
wherein not all segments of said plurality of connected line segments are collinear;
a radio frequency element coupled to said loop antenna and configured to receive signals from said loop antenna; and,
a passive component coupled to said loop antenna and configured to affect a resonant frequency of said loop antenna;
wherein
said tubular sheet comprises a plurality of radio frequency element mounting locations for said radio frequency element;

each radio frequency element mounting location of said plurality of radio frequency element mounting locations comprises at least two connections to said tubular sheet;

an impedance of said loop antenna to said radio frequency element varies based on which radio frequency element mounting location of said plurality of radio frequency element mounting locations is used to attach radio frequency element to said tubular sheet;

said tubular sheet further comprises a plurality of passive component mounting locations for said passive component;

said plurality of passive component mounting locations lie along said slot;

said slot comprises sides;

each passive component mounting location of said plurality of passive component mounting locations comprises at least one connection to said tubular sheet on each side of said slot;

said resonant frequency of said loop antenna varies based on which passive component mounting location of said plurality of passive component mounting locations is used to attach said passive component to said tubular sheet; and said passive component comprises one or more of a capacitor, an inductor, and a resistor.

* * * * *